United States Patent
Slavin et al.

(12)
(10) Patent No.: US 7,805,365 B1
(45) Date of Patent: Sep. 28, 2010

(54) AUTOMATED STATEMENT PRESENTATION, ADJUSTMENT AND PAYMENT SYSTEM AND METHOD THEREFOR

(75) Inventors: Fred Slavin, Manalapan, NJ (US); Eric Baltuch, New York, NY (US); Margaret Wren, Brooklyn, NY (US); Dennis Gniewosz, Brooklyn, NY (US); James P. Pretlow, III, Los Angeles, CA (US); Freddy J. Marin, Hempstead, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 09/518,948

(22) Filed: Mar. 6, 2000

Related U.S. Application Data

(60) Provisional application No. 60/161,270, filed on Oct. 25, 1999.

(51) Int. Cl.
G06Q 40/00 (2006.01)
(52) U.S. Cl. .......................... 705/40; 705/39
(58) Field of Classification Search .................. 705/34, 705/40, 35, 36, 37, 58, 39, 28, 29, 1, 10, 705/26
See application file for complete search history.

(56) References Cited

U.S. PATENT DOCUMENTS

| | | |
|---|---|---|
| 3,653,480 A | 4/1972 | Yamamoto et al. |
| 4,205,780 A | 6/1980 | Burns |
| 4,264,808 A | 4/1981 | Owens et al. |
| 4,321,672 A | 3/1982 | Braun et al. |
| 4,396,985 A | 8/1983 | Ohara |
| 4,495,018 A | 1/1985 | Vohrer |
| 4,617,457 A | 10/1986 | Myers |
| 4,672,377 A | 6/1987 | Murphy |
| 4,700,055 A | 10/1987 | Kashkashian, Jr. |

(Continued)

FOREIGN PATENT DOCUMENTS

EP 421808 4/1991

(Continued)

OTHER PUBLICATIONS

Annual Report Pursuant to Sectin 13 or 15(d) of the Securities Exchange Act of 1934, Form 10-K, Intelidata Technologies Corporation, Fiscal Year Ended Dec. 31, 2001.

(Continued)

*Primary Examiner*—Stefanos Karmis
(74) *Attorney, Agent, or Firm*—Hunton & Williams LLP

(57) ABSTRACT

A system and method are provided which accept orders from customers located at distributed locations, manages the ordering process by presenting a consolidated invoice to the seller, allows the seller to indicate which items are being paid along with a reason code for items for which payment is being withheld, accepts a consolidated payment, and allocates that payment to the appropriate selling subsidiary. In general, one or more orders are received from a buyer in which each of the orders corresponds to at least one seller subsidiary. The orders are consolidated into a consolidated invoice. The consolidated invoices are then made available to the buyer. An indication is received from the buyer as to which of the orders a payment is being approved. The payment, once received, is allocated to a corresponding at least one seller subsidiary for which the payment has been made.

51 Claims, 9 Drawing Sheets

U.S. PATENT DOCUMENTS

| | | |
|---|---|---|
| 4,752,877 A | 6/1988 | Roberts et al. |
| 4,797,913 A | 1/1989 | Kaplan |
| 4,799,156 A | 1/1989 | Shavit |
| 4,812,628 A | 3/1989 | Boston |
| 4,823,264 A | 4/1989 | Deming |
| 4,931,793 A | 6/1990 | Fuhrmann et al. |
| 4,948,174 A | 8/1990 | Thomson et al. |
| 4,974,878 A | 12/1990 | Josephson |
| 4,988,849 A | 1/1991 | Sasaki |
| 4,992,646 A | 2/1991 | Collin |
| 5,023,904 A | 6/1991 | Kaplan |
| 5,053,607 A | 10/1991 | Carlson |
| 5,054,096 A | 10/1991 | Beizer |
| 5,080,748 A | 1/1992 | Bonomi |
| 5,111,395 A | 5/1992 | Smith |
| 5,121,945 A | 6/1992 | Thomson et al. |
| 5,122,950 A | 6/1992 | Mee |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,220,501 A | 6/1993 | Lawlor |
| 5,225,978 A | 7/1993 | Peterson |
| 5,237,159 A | 8/1993 | Stephens |
| 5,265,007 A | 11/1993 | Barnhard, Jr. et al. |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,367,581 A | 11/1994 | VanHorn |
| 5,373,550 A | 12/1994 | Campbell |
| 5,396,417 A | 3/1995 | Burks |
| 5,402,474 A | 3/1995 | Miller |
| 5,412,190 A | 5/1995 | Kopesec |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glaser et al. |
| 5,446,740 A | 8/1995 | Yien |
| 5,448,471 A | 9/1995 | Deaton et al. |
| 5,465,206 A | 11/1995 | Hilt et al. |
| 5,477,040 A | 12/1995 | Lalonde |
| 5,479,494 A | 12/1995 | Clitherow |
| 5,483,445 A | 1/1996 | Pickering .................... 364/406 |
| 5,484,988 A | 1/1996 | Hills |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,544,043 A | 8/1996 | Miki et al. |
| 5,544,046 A | 8/1996 | Niwa |
| 5,550,734 A | 8/1996 | Tarter |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,599,528 A | 2/1997 | Igaki |
| 5,603,025 A | 2/1997 | Tabb |
| 5,615,109 A | 3/1997 | Eder |
| 5,621,201 A | 4/1997 | Langhans |
| 5,640,577 A | 6/1997 | Scharmer |
| 5,642,419 A | 6/1997 | Rosen |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,955 A | 10/1997 | Doggett et al. |
| 5,679,938 A | 10/1997 | Templeton |
| 5,679,940 A | 10/1997 | Templeton |
| 5,687,250 A | 11/1997 | Curley et al. |
| 5,692,132 A | 11/1997 | Hogan |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,249 A | 3/1998 | Powell |
| 5,748,780 A | 5/1998 | Stolfo |
| 5,751,842 A | 5/1998 | Eccles |
| 5,757,917 A | 5/1998 | Rose et al. |
| 5,770,843 A | 6/1998 | Rose et al. |
| 5,774,553 A | 6/1998 | Rosen |
| 5,784,696 A | 7/1998 | Melnikof |
| 5,793,861 A | 8/1998 | Haigh |
| 5,794,221 A | 8/1998 | Egendorf |
| 5,802,498 A | 9/1998 | Comesanas |
| 5,802,499 A | 9/1998 | Sampson et al. |
| 5,819,236 A | 10/1998 | Josephson |
| 5,819,238 A | 10/1998 | Fernholz |
| 5,825,003 A * | 10/1998 | Jennings et al. ............. 235/379 |
| 5,826,241 A | 10/1998 | Stein |
| 5,826,245 A | 10/1998 | Sandberg-Diment |
| 5,832,447 A | 11/1998 | Rieker |
| 5,832,460 A | 11/1998 | Bednar |
| 5,832,463 A | 11/1998 | Funk |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Bellinger et al. |
| 5,873,072 A | 2/1999 | Kight |
| 5,883,810 A | 3/1999 | Franklin et al. |
| 5,884,288 A | 3/1999 | Chang |
| 5,897,625 A | 4/1999 | Gustin |
| 5,898,157 A | 4/1999 | Mangili et al. |
| 5,903,878 A | 5/1999 | Talati et al. |
| 5,903,881 A | 5/1999 | Schrader |
| 5,910,896 A | 6/1999 | Hahn-Carlson |
| 5,910,988 A | 6/1999 | Ballard |
| 5,917,965 A | 6/1999 | Cahill et al. |
| 5,920,847 A | 7/1999 | Kolling et al. |
| 5,930,778 A | 7/1999 | Geer |
| 5,940,811 A | 8/1999 | Norris |
| 5,940,844 A | 8/1999 | Cahill et al. |

| | | | | | | |
|---|---|---|---|---|---|---|
| 5,943,656 A | 8/1999 | Crooks et al. ................. 705/30 | 6,227,447 B1 | 5/2001 | Campisano | |
| 5,945,653 A | 8/1999 | Walker et al. | 6,230,145 B1 * | 5/2001 | Verderamo et al. ............ 705/35 | |
| 5,956,700 A | 9/1999 | Landry | 6,233,566 B1 | 5/2001 | Levine et al. | |
| 5,963,659 A | 10/1999 | Cahill et al. | 6,236,972 B1 | 5/2001 | Shkedy | |
| 5,963,925 A | 10/1999 | Kolling et al. | 6,240,444 B1 | 5/2001 | Fin et al. | |
| 5,966,698 A | 10/1999 | Pollin | 6,278,981 B1 | 8/2001 | Dembo et al. | |
| 5,970,475 A * | 10/1999 | Barnes et al. ................. 705/27 | 6,289,322 B1 * | 9/2001 | Kitchen et al. ................. 705/40 | |
| 5,978,780 A | 11/1999 | Watson ........................ 705/40 | 6,292,789 B1 | 9/2001 | Schutzer | |
| 5,987,435 A | 11/1999 | Weiss et al. | 6,301,379 B1 | 10/2001 | Thompson et al. | |
| 5,987,436 A | 11/1999 | Halbrook | 6,304,858 B1 | 10/2001 | Mosler et al. | |
| 5,987,439 A | 11/1999 | Gustin et al. | 6,311,170 B1 * | 10/2001 | Embrey ...................... 705/40 | |
| 5,991,750 A | 11/1999 | Watson | 6,321,212 B1 | 11/2001 | Lange | |
| 6,000,832 A | 12/1999 | Franklin et al. | 6,324,524 B1 | 11/2001 | Lent et al. | |
| 6,003,762 A | 12/1999 | Hayashida | 6,338,047 B1 | 1/2002 | Wallman | |
| 6,006,208 A | 12/1999 | Forst et al. | 6,338,049 B1 | 1/2002 | Walker et al. | |
| 6,009,442 A | 12/1999 | Chen et al. | 6,343,279 B1 * | 1/2002 | Bissonette et al. ............ 705/41 | |
| 6,014,636 A | 1/2000 | Reeder | 6,374,235 B1 | 4/2002 | Chen et al. | |
| 6,016,482 A | 1/2000 | Molinari et al. | 6,393,409 B2 | 5/2002 | Young et al. | |
| 6,016,484 A | 1/2000 | Williams et al. | 6,405,173 B1 | 6/2002 | Honarvar et al. | |
| 6,026,388 A | 2/2000 | Liddy et al. | 6,411,942 B1 | 6/2002 | Fujimoto | |
| 6,029,139 A | 2/2000 | Cunningham et al. | 6,415,259 B1 | 7/2002 | Wolfinger et al. | |
| 6,029,141 A | 2/2000 | Bezos et al. | 6,418,419 B1 | 7/2002 | Nieboer et al. | |
| 6,032,133 A | 2/2000 | Hilt et al. | 6,418,420 B1 | 7/2002 | DiGiorgio et al. | |
| 6,032,134 A * | 2/2000 | Weissman ................... 705/40 | 6,418,430 B1 | 7/2002 | DeFazio et al. | |
| 6,032,137 A | 2/2000 | Hallard | 6,446,072 B1 | 9/2002 | Schulze et al. | |
| 6,035,281 A | 3/2000 | Crosskey et al. | 6,464,134 B1 | 10/2002 | Page | |
| 6,035,285 A * | 3/2000 | Schlect et al. ................. 705/30 | 6,490,568 B1 | 12/2002 | Omara et al. | |
| 6,035,287 A | 3/2000 | Stallaert et al. | 6,493,685 B1 | 12/2002 | Ensel et al. | |
| 6,038,553 A | 3/2000 | Hyde, Jr. | 6,535,896 B2 | 3/2003 | Britton et al. | |
| 6,041,312 A | 3/2000 | Bickerton et al. | 6,574,350 B1 | 6/2003 | Rhoads et al. | |
| 6,041,315 A | 3/2000 | Pollin | 6,574,377 B1 | 6/2003 | Cahill et al. | |
| 6,044,362 A | 3/2000 | Neely | 6,578,000 B1 | 6/2003 | Dodrill et al. | |
| 6,052,674 A | 4/2000 | Zervides et al. | 6,578,015 B1 | 6/2003 | Haseltine et al. | |
| 6,058,380 A | 5/2000 | Anderson et al. | 6,609,113 B1 | 8/2003 | O'Leary et al. | |
| 6,058,381 A | 5/2000 | Nelson | 6,609,125 B1 | 8/2003 | Layne et al. | |
| 6,061,665 A | 5/2000 | Bahreman | 6,629,081 B1 | 9/2003 | Cornelius et al. | |
| 6,064,764 A | 5/2000 | Bhaskaran et al. | 6,636,615 B1 | 10/2003 | Rhoads et al. | |
| 6,065,675 A | 5/2000 | Teicher | 6,704,714 B1 | 3/2004 | O'Leary et al. | |
| 6,067,524 A | 5/2000 | Byerly et al. | 6,721,715 B2 | 4/2004 | Nemzow | |
| 6,070,150 A * | 5/2000 | Remington et al. ........... 705/34 | 6,825,940 B1 | 11/2004 | Wu et al. | |
| 6,070,798 A | 6/2000 | Nethery | 6,954,896 B1 | 10/2005 | Dodrill et al. | |
| 6,073,104 A | 6/2000 | Field | 6,968,319 B1 * | 11/2005 | Remington et al. ........... 705/40 | |
| 6,073,113 A | 6/2000 | Guinan | 6,970,259 B1 | 11/2005 | Lunt et al. | |
| 6,076,072 A | 6/2000 | Libman | 6,999,943 B1 | 2/2006 | Johnson et al. | |
| 6,078,907 A | 6/2000 | Lamm | 7,024,385 B1 | 4/2006 | Adcock et al. | |
| 6,081,790 A * | 6/2000 | Rosen ........................ 705/40 | 7,062,456 B1 | 6/2006 | Riehl et al. | |
| 6,085,168 A | 7/2000 | Mori et al. | 7,104,443 B1 | 9/2006 | Paul et al. | |
| 6,088,683 A | 7/2000 | Jalili | 7,146,344 B2 | 12/2006 | Wankmueller | |
| 6,088,685 A | 7/2000 | Kiron et al. | 7,177,836 B1 | 2/2007 | German et al. | |
| 6,088,686 A | 7/2000 | Walker et al. | 2001/0018739 A1 | 8/2001 | Anderson et al. | |
| 6,092,056 A | 7/2000 | Tull, Jr. et al. | 2001/0032139 A1 | 10/2001 | Debonnett, Jr. | |
| 6,098,053 A | 8/2000 | Slater | 2001/0037284 A1 | 11/2001 | Finkelstein et al. | |
| 6,098,070 A | 8/2000 | Maxwell | 2001/0037309 A1 | 11/2001 | Vrain | |
| 6,105,011 A | 8/2000 | Morrison, Jr. | 2001/0047334 A1 | 11/2001 | Nappe et al. | |
| 6,108,639 A | 8/2000 | Walker et al. | 2001/0047489 A1 | 11/2001 | Ito et al. | |
| 6,110,044 A | 8/2000 | Stern | 2002/0012445 A1 | 1/2002 | Perry | |
| 6,111,858 A | 8/2000 | Greaves et al. | 2002/0013728 A1 | 1/2002 | Wilkman | |
| 6,115,690 A | 9/2000 | Wong | 2002/0023055 A1 | 2/2002 | Antognini et al. | |
| 6,119,106 A | 9/2000 | Mersky et al. | 2002/0026394 A1 * | 2/2002 | Savage et al. ................. 705/34 | |
| 6,119,107 A | 9/2000 | Polk | 2002/0038363 A1 | 3/2002 | MacLean | |
| 6,125,354 A | 9/2000 | MacFarlane et al. | 2002/0052842 A1 | 5/2002 | Schuba et al. | |
| 6,128,602 A | 10/2000 | Northington et al. | 2002/0055907 A1 | 5/2002 | Pater et al. | |
| 6,128,603 A | 10/2000 | Dent et al. | 2002/0069134 A1 | 6/2002 | Solomon | |
| 6,129,273 A | 10/2000 | Shah | 2002/0072976 A1 | 6/2002 | Virtanen et al. | |
| 6,138,118 A | 10/2000 | Koppstein et al. | 2002/0077978 A1 | 6/2002 | O'Leary et al. | |
| 6,144,946 A | 11/2000 | Iwamura | 2002/0087468 A1 | 7/2002 | Ganesan et al. | |
| 6,148,293 A | 11/2000 | King | 2002/0087469 A1 | 7/2002 | Ganesan et al. | |
| 6,149,056 A | 11/2000 | Stinson et al. | 2002/0091635 A1 | 7/2002 | Dilip et al. | |
| 6,173,272 B1 | 1/2001 | Thomas et al. | 2002/0099622 A1 * | 7/2002 | Langhammer ............... 705/26 | |
| 6,181,837 B1 | 1/2001 | Cahill et al. | 2002/0107770 A1 | 8/2002 | Meyer et al. | |
| 6,185,544 B1 | 2/2001 | Sakamoto et al. | 2002/0107788 A1 | 8/2002 | Cunningham | |
| 6,202,054 B1 | 3/2001 | Lawlor et al. | 2002/0111837 A1 | 8/2002 | Aupperle | |
| 6,205,433 B1 | 3/2001 | Boesch et al. | 2002/0138398 A1 | 9/2002 | Kalin et al. | |

| | | | |
|---|---|---|---|
| 2002/0170966 A1 | 11/2002 | Hannigan et al. | |
| 2002/0178071 A1 | 11/2002 | Walker et al. | |
| 2002/0184151 A1 | 12/2002 | Maloney | |
| 2002/0194096 A1 | 12/2002 | Falcone et al. | |
| 2002/0198817 A1 | 12/2002 | Dhir | |
| 2002/0199182 A1 | 12/2002 | Whitehead | |
| 2003/0018557 A1 | 1/2003 | Gilbert et al. | |
| 2003/0037002 A1 | 2/2003 | Higgins et al. | |
| 2003/0046218 A1 | 3/2003 | Albanese et al. | |
| 2003/0097335 A1 | 5/2003 | Muskowitz et al. | |
| 2003/0105641 A1 | 6/2003 | Lewis | |
| 2003/0110442 A1 | 6/2003 | Battle | |
| 2003/0120686 A1 | 6/2003 | Kim et al. | |
| 2003/0187789 A1 | 10/2003 | Karas et al. | |
| 2003/0191710 A1 | 10/2003 | Green et al. | |
| 2003/0208421 A1 | 11/2003 | Vicknair et al. | |
| 2003/0208441 A1 | 11/2003 | Poplawski et al. | |
| 2003/0225663 A1 | 12/2003 | Horan et al. | |
| 2003/0233305 A1 | 12/2003 | Solomon | |
| 2003/0237046 A1 | 12/2003 | Parker et al. | |
| 2004/0064409 A1 | 4/2004 | Kight et al. | |
| 2004/0078328 A1 | 4/2004 | Talbert et al. | |
| 2004/0201735 A1 | 10/2004 | Baron | |
| 2004/0228514 A1 | 11/2004 | Houle et al. | |
| 2005/0033690 A1 | 2/2005 | Antognini et al. | |
| 2005/0177480 A1 | 8/2005 | Huang | |

FOREIGN PATENT DOCUMENTS

| | | | |
|---|---|---|---|
| EP | | 1014318 | 6/2000 |
| WO | | WO 91/16691 | 10/1991 |
| WO | | WO 93/08545 | 4/1993 |
| WO | | WO 94/28497 | 12/1994 |
| WO | | WO 96/08783 | 3/1996 |
| WO | | WO 96/12242 A1 | 4/1996 |
| WO | | WO 97/14108 | 4/1997 |
| WO | | WO 97/45796 | 12/1997 |
| WO | | WO 97/45814 | 12/1997 |
| WO | | WO 98/09260 | 3/1998 |
| WO | | WO 99/10823 | 3/1999 |
| WO | | WO9913422 | 3/1999 |
| WO | | WO 00/39979 | 7/2000 |
| WO | | WO 01/75730 A2 | 10/2001 |
| WO | | WO 02/063432 A2 | 8/2002 |
| WO | WO 2004/079603 | | 9/2004 |

OTHER PUBLICATIONS

Blockbuster running test of a stored value card, The American Banker, Sep. 1, 1995.
CES/NaBANCO introduces stored value card technology blockbuster video is first merchant partner, Business Wire, Inc., Jan. 15, 1996.
Card Flash Daily Payment Card News, www.cardweb.com, printed Sep. 23, 2004.
Anonymous, Chase Manhattan introduces new FEDI payables product, ProQuest document ID: 7806951, ISSN/ISBN: 02686635, May 1995.
Bills, Chase Pact Done, What's Next for Web Vendors?, The American Banker, Technology Section, Jun. 3, 2002, p. 23.
Reinbach, Chase steps up treasury system, ProQuest documednt Id 8723558, ISSN/ISBN: 10459472, Nov. 1995.
Anonymous, Chasing the global trend, Cash Management News, proQuest document ID 9319923, ISSN/ISBN: 02686635, Dec. 1995.
Malhotra, Clearing House Enumerates e-Payments Ills, The American Banker, vol, 167, No. 154, Aug. 23, 2002.
Marjanovic, Corporate Services: Chase Gears Up Global Payments System Series: 16, The American Banker, vol. 160, Issue 174, Sep. 11, 1995, p. 41.
Gluck, Creating a Global Cash-Management Game Plan, Bank Systems & Technology, Feb. 1997, p. 28.
Lamond, Credit Card Transactions Real World and Online, Paying by Credit Card-Real World and Online, http://www.virtualschool.edu/mon/ElectronicProperty/klamond/credit, printed Jul. 8, 2005, 17 pages.
Lamond, Keith, Credit Card Transactions Real World and Online, http://www.virtualschool.edu/mon/ElectronicProperty/klamond/credit_card.htm, pp. 1-17, printed Jul. 8, 2005.
Dialog file 20, #10279554.
Du Pont's Electronic Payments, Corporate EFT Report, v9, n1, Dialog file 636, Accession No. 01066902, Jan. 11, 1989.
Carreker, Electronic check presentment: Capturing new technology, http://proquest.umi.com, Banking Management, Rolling Meadows: vol. 71, Issue 2, Mar./Apr. 1995, p. 32, 5 pages.
Fidelity Helps Fund Sellers Trim the Taxes They'll Owe, The Wall Street Journal, Nov. 7, 2002.
First Data markets stored-value cards, Cards International, Jan. 30, 1996, p. 5.
Norris, First data unit develops blockbuster cash card, Omaha World Hearld Sunrise Edition, Business Section, Jan. 19, 1996, p. 16.
Harsh Truth: Your Investments Likely Won't Make Any Money.
Money, Initial Launch to 200 Credit Unions, USA Today.com, Jun. 27, 2002.
Decovny, Net Scope, Banking Technology, May 1997.
Nokia Announces the World's First NFC Enabled Mobile Product for Contactless Payment and Ticketing, PRNewswire, Feb. 9, 2005.
Goode, On Profit, Loss and the Mysteries of the Mind, The New York Times, Nov. 5, 2002.
Anonymous, Operating in a multi-currency environment, ProQuest document ID 9215937, ISSN/ISBN 09589309, Oct. 1995.
Maher and Troutman, Payor's Prescription for Painless Migration to Electronic Healthcare Payments and Remittance Advices, PNC Bank, Dec. 2001.
Press Release, Mar. 5, 2004, Payment Data Systems Files Patent on Debit Card Payment Solution, American City Business Journals, Inc., Mar. 5, 2004.
Maher and Troutman, Provider's Prescription for Painless Migration to Receipt of Electronic Healthcare Payments and Remittance Advices, PNC Bank, Dec. 2001.
Anonymous, Systems spell change for foreign exchange, Global Investor, ProQuest document ID 1056152B, ISSN/ISBN: 09513604, Nov. 1996.
French, Tech Stocks: Market Movers, Investors Worry CheckFree Being Chased from Its Own Game, http://www.thestreet.com, Jun. 20, 2002.
Technology, In Brief Wachovia-InteliData Deal, May 7, 2002.
Zuckerman, The Hedge-Fund Craze, The Wall Street Journal, Jun. 12, 2002.
McDonald, The Stars in the Sky Flicker, And Fund Stars Do the Same, The Wall Street Journal, Jan. 15, 2003.
Anonymous, Visa & Carnegie Mellon Plan Online Payment Scheme, Newsbyte News Network, Feb. 15, 1995.
Financial News, Wells Fargo Rolls Out Nationwide Lockbox Check Conversion, PR Newswire Association, Apr. 22, 2003.
Terrie Miller and Henry Yan, When Custody Governs, Benefits Canada, Toronto, Feb. 1998, vol. 22, Issue 2, p. 33, 5 pages.
Michael Miller, "The Complete Idiot'd Guide to Ebay Online Auctions", copyright Jul. 1999.

* cited by examiner

SELLER CO. CONSOLIDATED MONTHLY STATEMENT

Client: Buyer Co.

Reference # 1234

| | | Amount: | Code: |
|---|---|---|---|
| ☒ | Invoice X.....$3,000 | $3,000 | 12 |
| ☒ | Invoice Y.....$4,000 | $2,000 | 53 |
| ☒ | Invoice Z.....$5,000 | $5,000 | 41 |
| | Total... $12,000 | $10,000 | 99 |

Approve: ☐

Pay: ☐

FIG. 8

AUTOMATED STATEMENT PRESENTATION, ADJUSTMENT AND PAYMENT SYSTEM AND METHOD THEREFOR

This application is based on, and claims priority to, U.S. Provisional Application No. 60/161,270, entitled AUTOMATED STATEMENT PRESENTATION, ADJUSTMENT AND PAYMENT SYSTEM, filed Oct. 25, 1999, whose contents are incorporated herein by reference.

BACKGROUND OF THE INVENTION

The present invention relates to a system and method for a complete ordering to payment allocation system, and in particular, to a system and method which accepts orders from customers located at distributed locations, manages the ordering process by presenting a consolidated invoice to the seller, allows the seller to indicate which items are being paid along with a reason code for items for which payment is being withheld, accepts a consolidated payment, and allocates that payment to the appropriate selling subsidiary.

As the global economy continues to flourish, increased demands are being placed on sellers to provide consolidated invoices, i.e., statements, to buying companies. This task is particularly difficult because orders from a large buying entity are typically received from many subsidiaries within the buying entity and from many geographically distributed locations. The buyers often remit payments, or partial payments, for the consolidated invoice to the seller. As a result, the seller is unable to determine exactly which items on the invoice are being paid, and which items are exceptions or are in dispute. As used herein, the terms "exception" and "dispute" are used interchangeably. In general exceptions and disputes differ from one another in terms of degree of severity, a dispute rising to the level of an unresolved exception which requires human intervention.

In order to determine which items are exceptions or are in dispute, a representative from the selling company must contact one or more representatives of the buying company in an attempt to reconcile the invoice items. The representatives must then work to resolve the exceptions and disputes. Exceptions and disputes can arise, for example, when an item is not received by the buyer, when the item is defective or when the item received is not the item which was ordered. The dispute/exception determination and resolution process can be time consuming, and can prevent the seller from properly allocating the portion of the received payment to the correct selling subsidiary.

The difficulties described above are further exacerbated when the buying company's representatives are internationally distributed, and are ordering from internationally distributed selling subsidiaries. In this case, issues of foreign exchange further compound the invoicing, consolidation and payment allocation processes. Current processes typically require multiple foreign exchanges and currency conversions. These foreign currency exchanges are costly, even when the buyer has used a credit card to pay for the ordered goods.

Large buyers, particularly buyers from a company which has many international locations, want to receive one main bill in one currency, for example, U.S. dollars, and regional bills for the international entities in local currencies so that the international locations know what their cost will be, even if the actual invoice is paid in the currency corresponding to the main bill.

In addition, large companies want to effectively meet the regulatory requirements affecting their entities in a manner which still allows the maximization of profits. As such, both buyers and sellers must report and manage their systems and processes to satisfy local tax and regulatory issues.

It should be noted that the terms "goods," "services" and "items" refer to those things ordered by a buyer and are used interchangeably herein.

An example of a prior art sales system is explained with reference to FIG. 1. FIG. 1 is a block diagram of prior art sales system 2. In this type of system, buyers 4 from different buyer locations 6 each individually order items from a seller by contacting a seller division 8. In the case of sales system 2, different buyers, even from the same buying location 6, place orders directly with the subsidiary which will supply the item. Seller divisions 8 can be geographically separated across international boundaries. The arrangement of sales system 2 makes invoice consolidation virtually impossible.

As a result, each seller division 8 prepares a separate invoice for each buyer location 6. The buyer 4 at each buyer location 6 must then cull through the invoices, often paying each invoice separately through the issuance of multiple checks, wire transfers, etc. In addition, should a dispute or exception arise, buyer 4 will typically not authorize payment for the entire invoice until the dispute or exception can be resolved. Buyers 4 often will not make it clear which items on an invoice are exceptions or are in dispute. Thus, the seller has no way to know that there is an exception or dispute until the partial payment is received. This prolongs the time in which the seller must wait to receive payment because the dispute/exception resolution process does not start until the seller receives the partial payment.

Using the model of sales system 2, the process often implicates the seller's bank, because the bank might receive an electronic wire transfer or lock box payment, part of which is in dispute, with no way to accurately determine which seller division 8 should receive credit for the deposit. This situation is particularly onerous in the case where seller divisions 8 are distributed across international boundaries such that foreign exchange procedures must also be considered. Thus, prior art sales system 2 does not allow for invoice consolidation, efficient invoice verification by the buyer, allocation of payments to the appropriate subsidiary and an environment where disputed payments are made known to the seller prior to receipt of the partial payment.

With the proliferation of global computing networks, such as the Internet and private networks, many sellers have implemented network-based ordering systems, an example of which is shown in FIG. 2 and is designated as ordering system 10. Systems such as ordering system 10 facilitate the ordering and booking of buyer purchases, but do not solve the problems of invoice consolidation, order verification, exception resolution and payment processing. As shown in FIG. 2, buyers 4 at buyer locations 6 use network 12 to access seller web site 14. Network 12 is typically a private network or the Internet. Seller web site 14 typically runs on a processing server and is arranged to accept order's from customers with prearranged accounts, or from a customer who supplies a credit card number used to pay for the ordered items. Seller web site 14 then electronically distributes the received orders to the appropriate seller geography 16. Distribution is typically based on a correlation between the geography of the ordering buyer location 6, or the geography which can fill the order in the must expedient manner.

In a typical seller web site 14, buyers are presented with an opportunity to browse through the seller's product offerings, and can build an electronic list of items to be purchased, and subsequently invoiced. These invoices, however, are not consolidated, and are presented in bulk back to the original buying location 6 or to the buyer's main designated location. In addition to the inability to prepare consolidated invoices, systems such as ordering system 10 do not allow buyers to electronically verify that their orders have been received or to indicate the allocation of the payment to received items to facilitate the exception resolution process. The systems also do not allow the seller or seller's bank to allocate the received payment to the appropriate geography 16 or to transfer received funds to the geography's corresponding banks or bank accounts.

In sum, there is no existing system which provides an end-to-end "quote-to-payment" system which allows a seller to accept and book orders, prepare a consolidated invoice for the buyer, allow the buyer to electronically view the consolidated invoice, verify those items for which a consolidated payment is being remitted, begin dispute and exception resolution procedures, receive the consolidated payment, allocate the payment to the individual subsidiaries (geographies, divisions, locations, etc.) and transfer funds to banks or bank accounts associated with those selling entities.

SUMMARY OF THE INVENTION

The present invention provides a system and method which allows seller to accept and book orders, allows the seller to prepare a consolidated invoice for the buyer. The buyer is notified that the consolidated invoice is available and can electronically view the consolidated invoice, verify those items for which a consolidated payment is being remitted and begin dispute and exception resolution procedures. The method and system receive the consolidated payment, allocate the payment to the individual subsidiaries (geographies, divisions, locations, etc.) and transfer funds to banks or bank accounts associated with those selling entities, even when foreign exchange is involved. Further, the present invention allows the seller to maximize profits by booking and fulfilling orders and obtaining payment in a form which minimizes foreign exchange exposure.

The present invention provides a method for an ordering and payment allocation system in which one or more orders are received from at least one buyer, each of the orders corresponding to at least one seller subsidiary. The orders are consolidated into a consolidated invoice. The consolidated invoice is made available to the at least one buyer. An indication is received from the at least one buyer as to which of the orders a payment is being approved. The payment is allocated to a corresponding at least one seller subsidiary for which the payment has been made.

As another aspect, the present invention provides an ordering and payment allocation system in which there is an order management system. The order management system:

receives at least one order from, a buying organization having at least one buyer;

evaluates the at least one order against one or more criteria, orders which meet the one or more criteria are approved orders;

books the approved orders;

generates a consolidated invoice based on the approved orders;

makes the consolidated invoice available to the buying organization; and receives an approval indication from the buying organization, the approval indication includes an identification of those booked orders for which payment is authorized. A funds distribution system facilitates the distribution of the authorized payment received from the buying organization.

As still another aspect, the present invention provides an order management system which uses a communication network to support at least one selling entity and one or more unaffiliated buying organizations, the order management system in which there is a database. A network interface is coupled to the communication network. A processor executes functions which include:

receiving at least one order from a buying organization having at least one buyer;

evaluating the at least one order against one or more criteria, orders which meet the one or more criteria being approved orders;

generating a consolidated invoice based on the approved orders;

making the consolidated invoice available to the buying organization; and receiving an approval indication from the buying organization, the approval indication including an identification those approved orders for which payment is authorized.

As another aspect, the present invention provides a method for allocating funds received from a buying organization in which the received funds are disaggregated to associate portions of the received funds with one or more selling sub-entities. The received funds are processed to update an accounts receivable system. Funding reports are delivered to the respective sub-entities. The disaggregated funds are transferred to financial accounts for the corresponding sub-entities.

The present invention also provides a storage medium storing computer executable programmatic code for an order management system which, when executed, receives one or more orders from at least one buyer, each of the orders corresponding to at least one seller subsidiary. The orders are consolidated into a consolidated invoice. The consolidated invoice is made available to the at least one buyer. An indication is received from the at least one buyer as to which of the orders a payment is being authorized.

Other features and advantages of the present invention will become apparent from the following description of the invention which refers to the accompanying drawings.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

FIG. 8 is an example of a terminal display screen used to approve consolidated invoices in accordance with the present invention;

DETAILED DESCRIPTION OF EMBODIMENTS OF THE INVENTION

Figure 1:
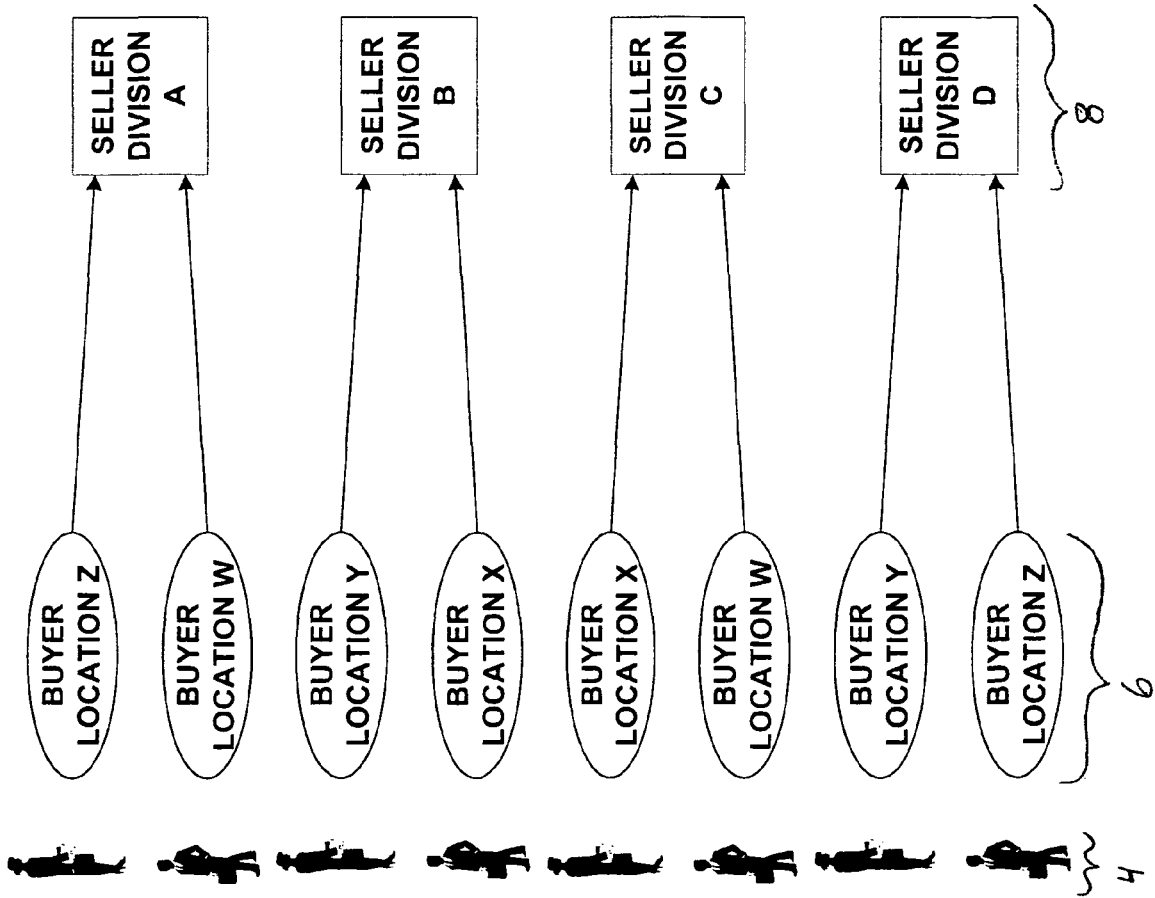
FIG. 1 is a block diagram of a prior art sales system.
Figure 2:
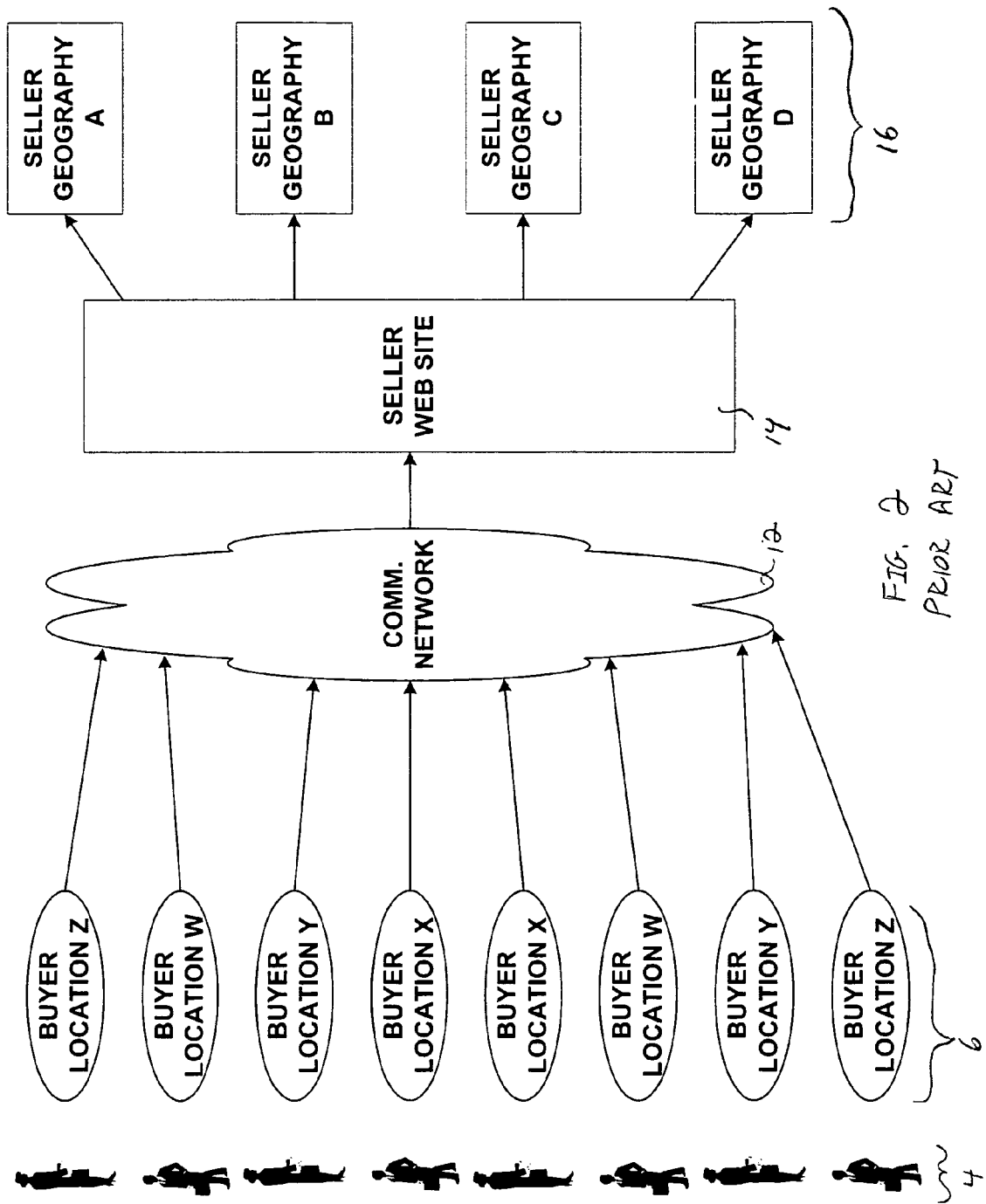
FIG. 2 is a block diagram of a prior art network-based ordering system.
Figure 3:
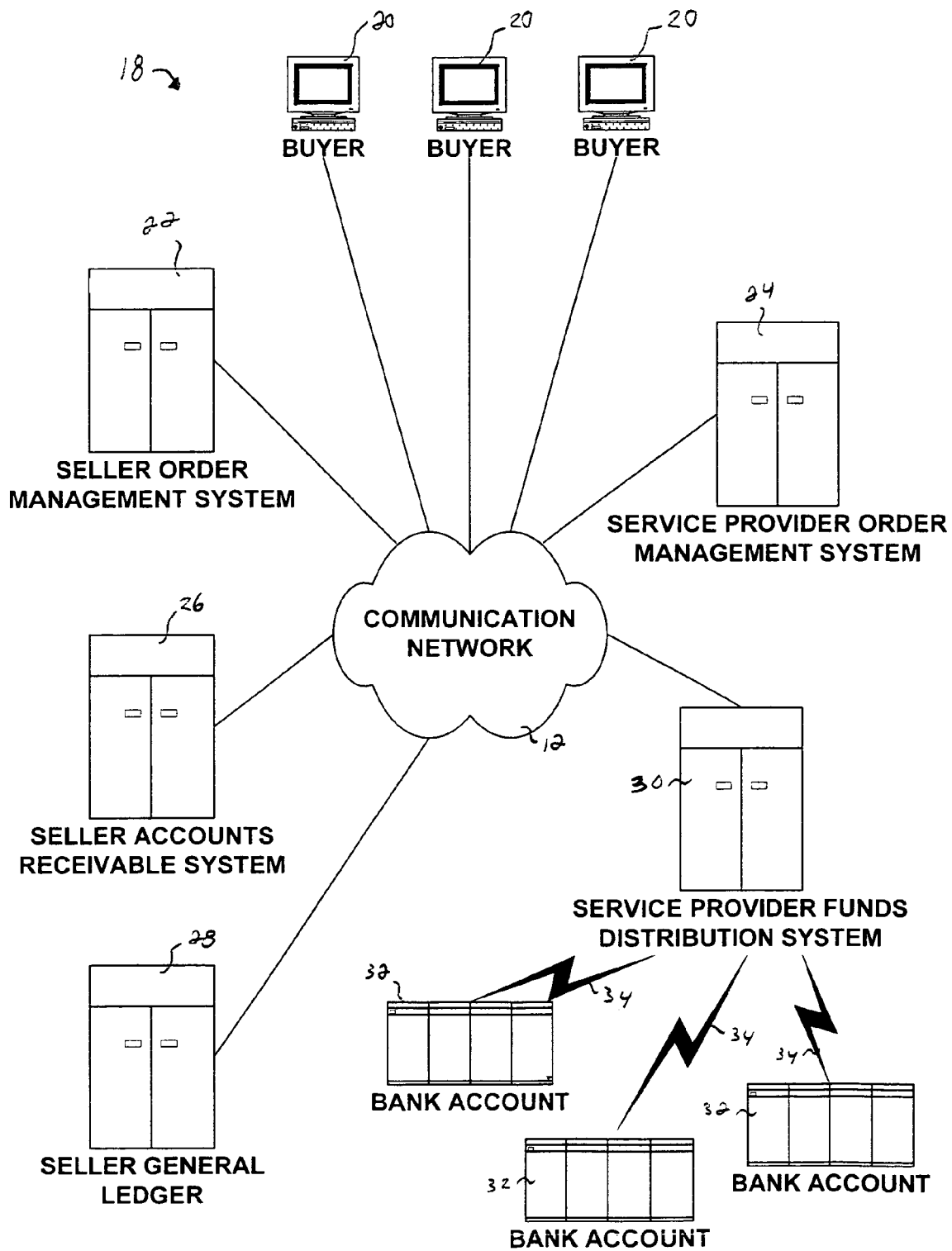
FIG. 3 is a diagram of the hardware elements of the system of the present invention.

Referring now to the figures in which like numerals refer to like elements, there is shown in FIG. 3 a system constructed in accordance with the principles of the present invention and designated generally as "18". System 18 provides complete environment for the "quote to payment" system, allowing a buyer to place orders, and have those orders managed so as to consolidate them, allow for verification, manage invoice disputes and receive and allocate payments to the proper selling entity.

System 18 is preferably comprised of one or more buyer terminals 20 coupled to one or both of seller order management system 22 and service provider order management system 24. As used herein, the term "service provider" refers to a third party other than the seller and the buyer, such as a bank or other financial institution which provides order management and payment processing services. Also coupled to communication network 12 is the seller's account receivable system 26, the seller's general ledger 28 and the service provider funds distribution system 30. Service provider funds distribution system 30 is further coupled to one or more bank accounts 32 via communication links 34.

It should be noted that, although elements 20-30 are shown as each coupled to a single communication network 12, this arrangement is shown merely for the convenience of aiding explanation of the present invention and is not limited to such. For example, communication network 12 can be the Internet or other public or private network comprised of multiple communication networks, coupled together by network firewalls or other communication elements. Similarly, the seller's components comprised of order management system 22, seller account receivable system 26 and seller general ledger 28 can be coupled together on the seller's communication network while the service provider's components comprised of service provider order management system 24 and service provider funds distribution system 30 can be coupled together on the service provider's network. The seller's network and service provider's network can be coupled together via appropriate communication hardware to provide access for buyer terminals 20.

Although FIG. 3 shows a single seller order management system 22 and a single service provider order management system 24, the invention is not limit to such. It is contemplated that more than one seller order management system 22 and more than one service provider order management system 24 can be implemented within system 18. This is the case even where the multiple service provider order management systems 24 are owned and operated by disparate or unrelated entities.

In addition, FIG. 3 shows bank accounts 32 coupled via individual Communication links 34 to service provider funds distribution system 30. It is contemplated that bank accounts 32 can also be coupled to communication network 12, or coupled to service provider funds distribution system 30 using any known networking topology and technology.

Buyer terminals 20 are comprised of any computing platform capable of running an Internet web browser or similar software. Examples of suitable web browsers include MICROSOFT's INTERNET EXPLORER and NETSCAPE's COMMUNICATOR. The computing platform itself for buyer terminals 20 can vary depending on the needs of each particular buyer and can range from a desktop or laptop personal computer or personal digital assistant to a UNIX-based workstation.

Buyer terminals 20 preferably communicate with the other devices in system 18 using the Transmission Control Protocol/Internet Protocol (TCP/IP) upon which particular subsets of that protocol can be used to facilitate communications. Examples include Hypertext Transfer Protocol (HTTP) data carrying Hypertext Markup Language (HTML) web pages, JAVA and Active-X applets and File Transfer Protocol (FTP). Seller order management 22 and service provider order management system 24 are each capable of generating the HTML pages and applets, and communicating them to buyer terminals 20. For example, communication may take the form of files delivered using FTP in electronic data interchange (EDI), Bank Administration Institute (BAI) or Extensible Markup Language (XML) formats as agreed to by the sending and receiving parties.

Seller order management system 22 and service provider order management system 24 are comprised of one or more processors coupled to one or more databases which support the order entry, booking, consolidation, verification and payment allocation processes described in detail below. In addition, seller order management system 22 and/or service provider management system 24 further comprise a network interface (not shown) to couple the system to communication network 12, and include provisions for a web site or other technology which can create a network presence from which the seller can electronically offer goods or services. Technologies including hardware and software for establishing web sites such as an Internet web site are known. The particular components of seller order management system 22 and service provider order management system 24 are described in detail below.

Order management systems 22 and 24 can be comprised of any suitable processor arrangement designed to accommodate the expected number of buyers 20 and transactions for the particular system in which these elements will be implemented. Known software languages and database technologies can be used to implement the described processes. Databases and programmatic code on stored in suitable storage devices within or which have access to systems 22 and 24. For example, order management systems 22 and 24 can be comprised of UNIX-based minicomputers or mainframe computers arranged with a suitable database, such as database technology provided by the Oracle Corporation.

Seller account receivable system 26 can be any known accounts receivable (A/R) system ranging from small personal computer-based systems to large mainframe-based systems. A/R systems are known to those of ordinary skill in the art and are suitable for use as long as they are capable of interoperating with communication packages to transmit and receive data across communication network 12. Also, seller account receivable system 26 is not necessarily owned and operated by the seller. Seller account receivable system 26 can be outsourced to the service provider or a third party.

Similarly, seller general ledger 28 can be any known general ledger accounting system suitable for use in the operating environment in which it is placed. Known general ledger systems are available which range from personal computer-based general ledgers to mainframe-based general ledgers. Any such system is suitable provided it can interoperate with communications software to send and receive data to other devices via communication network 12.

Service provider funds distribution system 30 can be any such system known in the art which is capable of communicating with other financial institutions or other bank account processors across a network or communication link, for example, an automated clearing house system. Hardware for implementing service provider funds distribution systems is known to those of ordinary skill in the art and are typically mainframe computers, although any computing platform capable of performing funds distribution is suitable for use in the present invention. In particular, service provider funds distribution system 30 executes wire transfers to bank accounts 32 and provides details of the wire transfers to the appropriate selling entity. Of course, the particular accounting details can be provided by service provider order management system 24 of any other device capable of communicating with the seller's computing systems.

The overall operation of system 18 is described with reference to the flow chart shown in FIG. 4. Within a selling organization, there are traditionally three distinct operational working capital processes. The first is the sales to collections process. This process involves setting individual sales and collection policies, evaluating a buyer's credit, making the sale to the buyer, actually taking the buyer's orders, including shipping instructions, sending the buyer an invoice and booking the order, receiving and depositing the payment from the buyer, matching the payment to the order, processing exceptions and handling inquiries and exceptions/disputes. The second operational working capital process involves the actual supply chain which includes transporting the items, managing the materials associated with the items, assembling, packaging, warehousing and shipping the items.

The third major process is buyer oriented and involves the process which includes purchasing to actually making the payment. This process includes setting buying policies, selecting a seller, ordering the items, receiving an invoice from the seller, approving payment, transmitting payment instructions to a financial institution, actually paying the invoice, reporting and reconciling the payments made with the items received, and addressing inquiries and exceptions/disputes. The present invention incorporates aspects of all three operational working capital processes, but primarily encompasses the sales to collection and purchasing to payments processes.

It should be noted that, although the present invention is described using corporate, i.e., divisional boundaries, the invention is not limited to such. Any business, legal or geographical arrangement can be supported using the present invention. For example, regulatory and legal issues surrounding maximization of profit and minimization of expenses such as taxes and fees are another appropriate entity/subsidiary arrangement. As such, a subsidiary can include affiliates, branches, joint ventures and the like.

The present invention, therefore, can be used by sellers to efficiently consolidate and supply orders in a manner which maximizes profits and minimizes fees and taxes while meeting government regulations. In other words, it is contemplated that order flow can be managed based on seller's production facilities without regard to geography so as to ensure that tax and regulatory issues are not negatively impacted. As part of the same concept, the method and system of the present invention can be used to manage foreign exchange (f/x) exposure and transaction costs, allowing for the maximization of profits. In part, this is accomplished by obviating the need to convert to a base currency such as U.S. dollars. For example, it may be more cost effective and prudent from a regulatory sense to convert from Euros to Mexican Pesos that from Euros to Dollars to Pesos.

Figure 4:
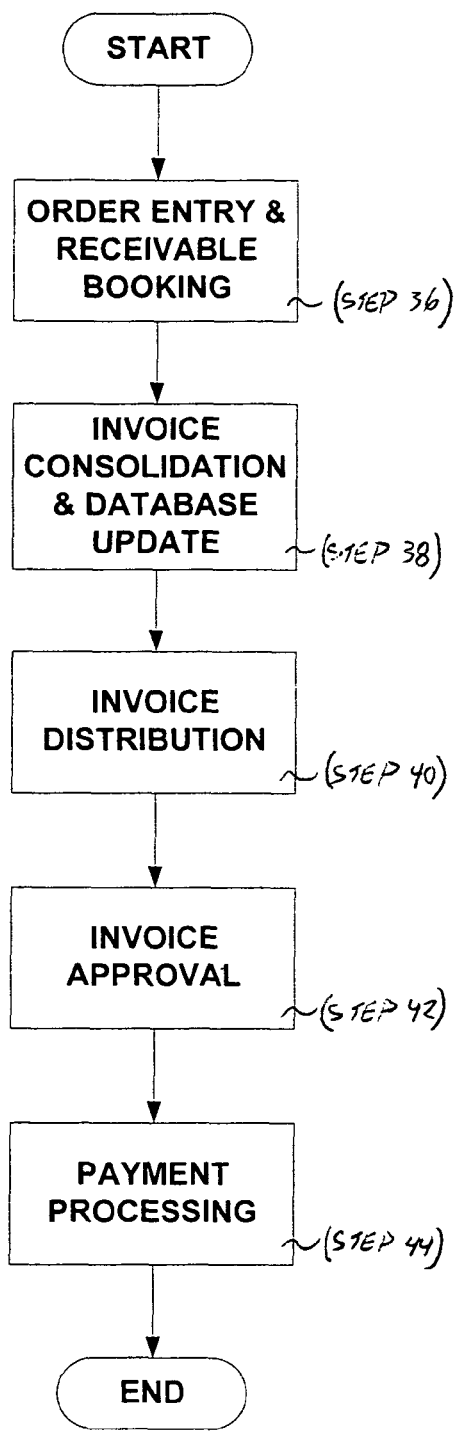
FIG. 4 is a flow chart of the overall operation of the present invention.

Turning now to FIG. 4, a buyer using buyer terminal 20 enters an order. The order is entered on seller order management system 20 or service provider order management system 24 and the receivable booked (step 36). In the case where the order is received by service provider order management system 24, order management system 24 communicates the booked order to the seller, for example, to seller order management system 22. Booked orders are accumulated for a predetermined period of time, for example, monthly, and the associated invoices are consolidated and the database on service provider order management system 24 is updated to reflect the consolidated invoice and its supporting details (step 38). During the invoice consolidation and database update step, a unique reference number is assigned to the consolidated invoice for tracking and invoice management purposes.

It should be noted that the present invention is not limited to invoice generation based on shipped orders. The present invention facilitates the separation of order fulfillment from invoicing. Once an order is booked, the present invention can generate an invoice without requiring that the order actually be shipped or received by the purchaser. This is because the invoice consolidation process does not rely on product receipt acknowledgment as a condition of invoice generation.

The consolidated invoice includes totals for each invoice for that predetermined period, along with a total amount. The consolidated invoice, along with the specific details for each invoice within the consolidated invoice are sent by service provider order management system 24 (or seller order management system 22) to one or more designated buyer terminals 20, but preferably, to a single designated buyer terminal 20 (step 40) such as the accounts payable manager's terminal. Individual buyers associated with each invoice can then access their particular invoice or invoices and approve all or a part of those invoices which are their responsibility (step 42). As described in detail below, an embodiment of the present invention allows buyers to initiate payment by selecting an appropriate box, button, etc. from the same (display screen in which the payment amount, disputed/excepted items are presented and entered. Those individual items which are not approved are set aside for exception resolution.

The approved consolidated invoice or a part thereof is transmitted back to service provider order management system 24, thereby informing the seller as to exactly which invoice components are approved and being paid for, and exactly which items are exceptions or are in dispute. This occurs prior to, or commensurate with, the actual payment, thereby allowing the seller an opportunity to begin exception/dispute resolution processing with particular knowledge of those disputed items.

Finally, the buyer remits payments to the seller, preferably as a single payment via lock box, wire transfer, automated clearing house or foreign exchange trade. This payment is then processed (step 44) to unconsolidate the payment to reflect those particular items for which the payment is to be applied. The unconsolidated payment data is communicated to service provider funds distribution system 30 which then transfers funds corresponding to the paid items to bank accounts 32 associated with the subsidiary who booked the particular order.

The process of the present invention as implemented on system 18 allows end-to-end order to payment allocation processing by a seller, and allows the seller to meet the business needs of buyers, especially large buyers, by providing a mechanism for consolidated invoicing and exception resolution. The overall hardware arrangement and process having been explained, each of steps 36-44 will now be explained in detail.

Figure 5:
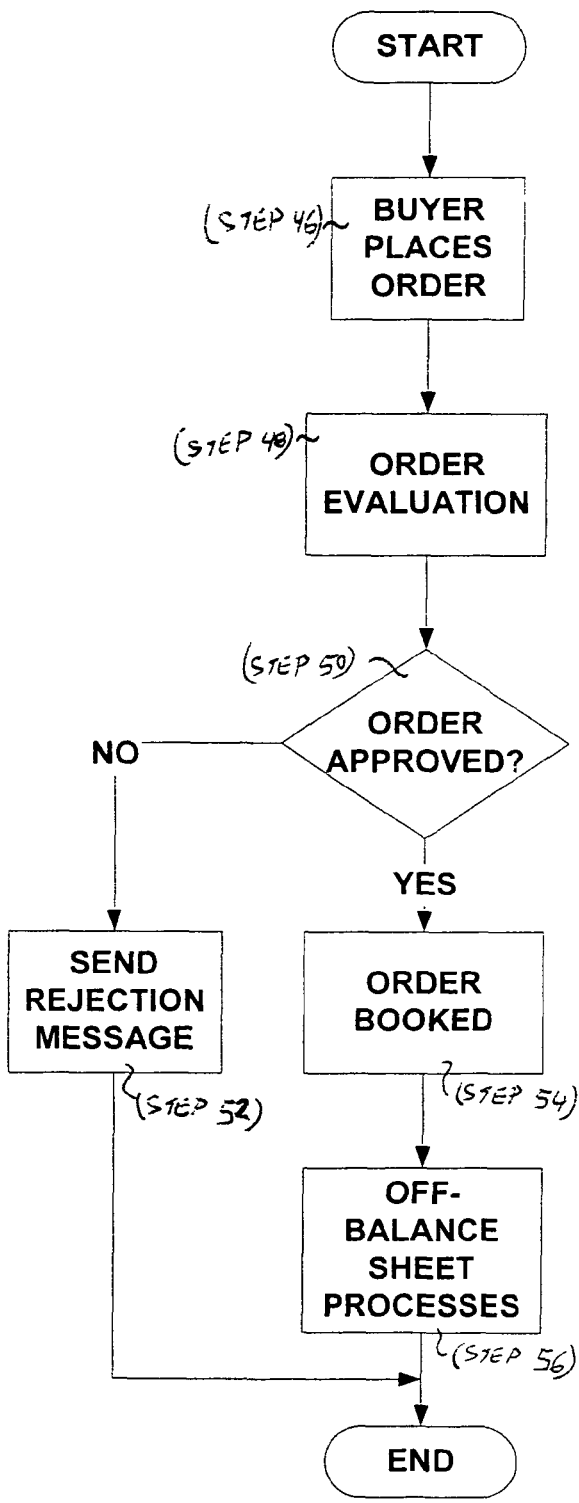
FIG. 5 is a flow chart of the order entry and receivable booking process of the present invention.

The order entry and receivable booking process of step 32 is explained in detail with reference to the flow chart of FIG. 5. At the beginning of the process, a buyer 4 places an order with the seller for a particular item or items (step 46). Buyer 4 can place the order using buyer terminal 20 by placing the order directly through seller web site 14 using communication network 12. In this case, seller web site 14 can be created using known web site electronic commerce techniques. The buyer can also place the order by traditional means such as phone, fax and mail via a customer service representative who enters the order into order management system 22 or 24. As another alternative, electronic orders can be manually entered from traditional purchase requisitions. In sum, it is contemplated that any of a number of different types of methods can be used to enter an order, provided that order is eventually converted into an electronic order within order management system 22 or 24.

It should be noted that, although large customers typically prefer invoicing, small buyers, such as buyers from small companies or individuals may supply payment information in the form of a credit card number, e-cash, etc. at the time the order is placed. Unless otherwise noted, the operation of the present invention for large buyers and small buyers is the same.

One difference of note is that with a large company, seller web site 14 and/or order management system 22 or 24 may be configured to offer preferential pricing and offers to large buyers. In addition, large companies may also be offered dedicated web pages on seller web site 14 which are directed solely to the large company's interests. For example, a dedicated web page may include customized products, or products known by the seller to be desired by the buyer's company. On the other hand, smaller companies may not receive preferential pricing and may be forced to use a non-customized generic interface on seller web site 14.

Once the orders are received, order management system 22 or 24 evaluates the orders to make sure that they are complete and also preferably measures the purchase order amounts against the buying company's available credit and/or the individual buyer's spending limit (step 48). For example, a buyer company's available credit may be measured with respect to each particular selling entity as well as the selling parent. An individual buyer's spending limit can be measured against each buyer's maximum order total or individual item price.

Buyers are notified if their order is not approved (step 50) through the receipt of a rejection message sent by order management system 22 or 24 (step 52). The rejection message can be in the form of a web page sent to buyer terminal 20, an electronic mail message, or even a notification to the seller's customer service representative who then notifies the buyer that the order has been rejected.

In the case where the order has been approved, and where the order was originated by seller order management system 22, the seller books the approved order (step 54) and creates account receivable entries in seller account receivable system 26. In the case where the service provider is acting as the order entry point via service provider order management system 24, the service provider sends a notification to the seller, preferably by using a file transmitted to seller order management system 22 across communication network 12, that the orders have been approved and that the orders should be booked (step 54).

The seller then creates appropriate A/R entries in seller account receivable system 26 and notifies the appropriate selling entity or entities to fulfill the order. For example, selling organizations in manufacturing industries will interface to the own supply chains to begin the process of creating the product to fill the orders placed. Orders for services will be directed to the appropriate providers within the selling organization. Optionally, a seller may wish to execute off-balance sheet processes (step 56). For example, a seller may wish to finance its receivables through off-balance sheet financing. In this case, the service provider may offer the selling organization the option to securitize its receivables through a securitization program. Securitization methods are known to those of ordinary skill in the art and are typically determined based upon the quality and quantity of the orders received from the buyers.

Figure 6:
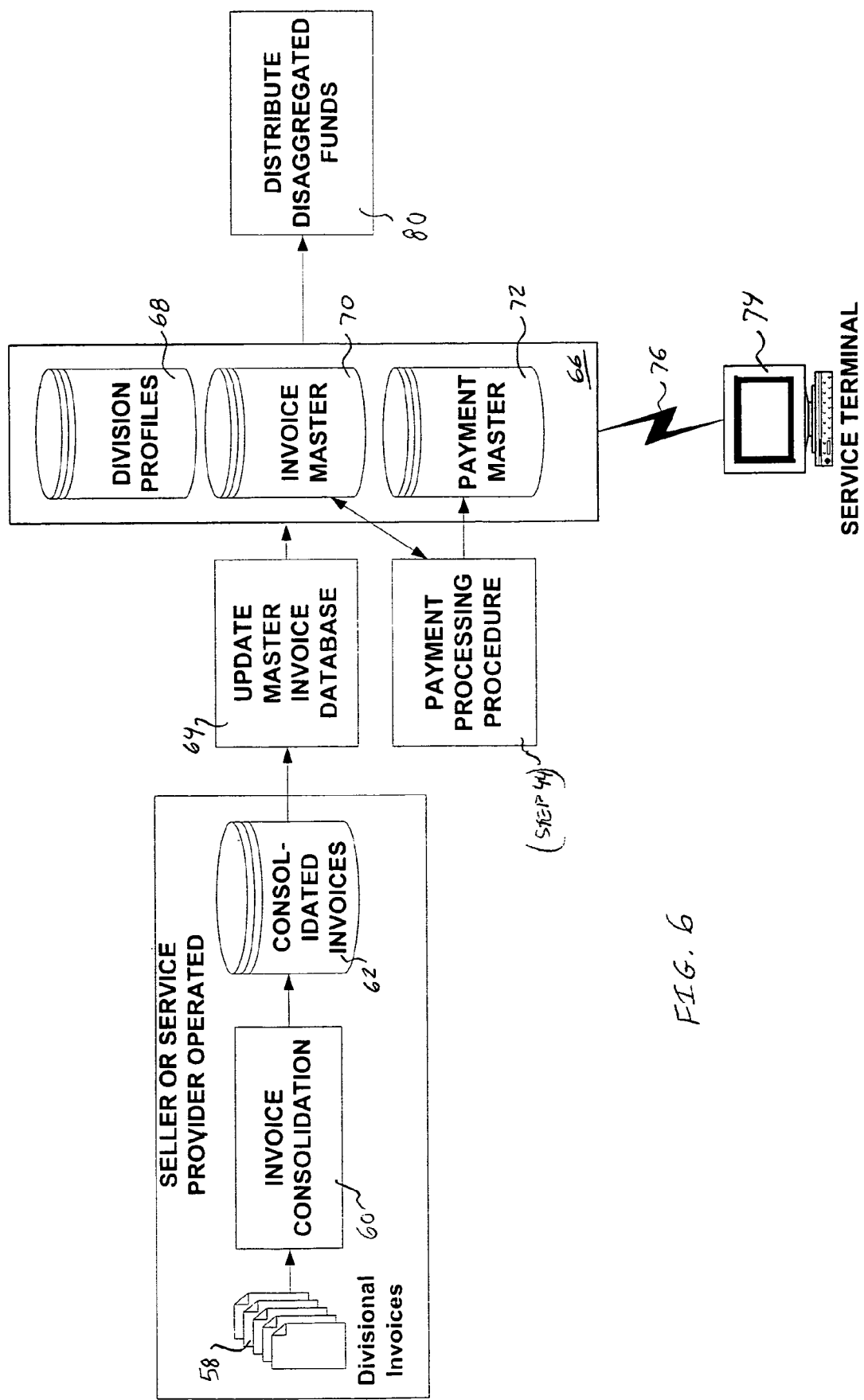
FIG. 6 is a diagram of the invoice consolidation and database update process of the present invention.

The invoice consolidation and database update process of step 38 is explained with reference to the process flow diagram in FIG. 6. As shown in FIG. 6, divisional (subsidiary) invoices 58 are subject to an invoice consolidation process 60 which are then stored as consolidated invoices in consolidated invoices database 62. Divisional invoices 58, invoice consolidation process 60 and the consolidated invoices database 62 can be received, processed and stored on seller order management system 22 or service provider order management system 24.

Divisional invoices 58 are invoices associated with the booked orders which have been sent to each selling entity for processing. Invoice consolidation process 60 involves correlating all of the divisional invoices 58 by sorting and compiling the invoices to create a single consolidated invoice, along with the details supporting each specific divisional invoice 58. Consolidated invoices can be arranged in any manner as discussed above. Techniques for manipulating a database to create a consolidated invoice, for example a database record or table comprising consolidated invoice data are known.

Once consolidated invoices have been created and stored in consolidated invoices database 62, the master invoice database must be updated via update master invoice database process 64. In the case where the consolidated invoices database 62 is present on seller order management system 22, update process 64 involves transmitting the consolidated invoice data across communication network 12 to service provider order management system 24, the repository for the invoice master database.

Databases 66 are part of service provide order management system 24 and comprise division profiles database 68, invoice master database 70 and payment master database 72. The actual consolidated invoices which are sent to the buyer are preferably generated from the service provider order management system 24, and not seller order management system 22.

In addition, service terminal 74 is coupled to seller's A/R system 26 or service provider order management system 24 to perform manual updates, maintenance and other operations on databases 66 and the processors associated with service provider order management system 24. Service terminal 74 can also be used to manually allocate funds for unmatched payments, modify invoice details, maintain subsidiary profiles, approve funds distributions, generate reports such as aging reports and paid and unpaid reports. Service terminal 74 accesses database 66 via communication link 76. Communication link 76 can be any known local or wide area communication facility, and can even be a communication link which allows service terminal 74 to be remote from service provider order management system 24 and accessed via communication network 12.

In order to properly track the invoices associated with the consolidated invoice, and to be able to allocate received payments against the individual items, databases 68-72 are configured to store different types of data associated with the overall quote-to-payment system.

Division profiles database 68 stores data relating to each selling entity. This is particularly useful in the case where subsidiaries (divisions) are international. A typical division profile record comprises:

identification code;
    subsidiary name;
    subsidiary address;
    subsidiary contact individual;
    subsidiary bank SWIFT code or ABA RTN;
    subsidiary bank account reference; and
    seller's general ledger account number.

The subsidiary identification code is a unique number assigned to that particular selling entity. Subsidiary name address and contact name provide other means for identifying the subsidiary. The subsidiary bank SWIFT (Society for Worldwide Interbank Financial Telecommunications) code or ABA RTN (American Bankers Association Transit Routing Number) allows service provider order management system 24 to properly instruct service provider funds distribution system 30 as to where their allocated payments should be wired. SWIFT is a known international system for the transmission of bank-to-bank messages in which each currency has a unique SWIFT currency code and each bank has a unique SWIFT address. ABA TRN refers to the magnetic ink character recognition (MICR) line field which includes an identification number for the institution housing the payor's account. The seller's general ledger account number refers to the identification number defining the account number to which entries corresponding to the subsidiary profile are made.

Master invoice 70 is preferably arranged to comprise two major components, the consolidated invoice data and supporting sub-invoice data.

The consolidated invoice records typically include:

invoice date;
    customer reference;
    consolidated invoice reference number;
    total invoice amount;
    invoice amount paid;
    invoice adjustment amount;
    invoice amount outstanding; and
    invoice amount distributed.

The invoice date refers to the date the consolidated invoice was prepared, the customer reference number refers to a unique identification number for the overall buyer, the consolidated invoice reference number which is created by service provider order management system 24 to track the overall consolidated invoice. The invoice amount reflects the total remittance by the buyer as applied to that invoice. The invoice adjustment amount reflects the amount which is deducted from the invoice or invoice line item prior to executing approval to pay or payment itself, i.e., the exception or disputed amount, if any. The invoice amount outstanding reflects the total unpaid amount for the consolidated invoice, and the invoice amount distributed reflects the total amount of the consolidated invoice which has been allocated and wired to the selling entities.

The second major component of the master invoice database is the sub-invoice component. The sub-invoice component provides the particularized details behind each consolidated invoice. Sub-invoice record fields include:

subsidiary code;
    invoice reference;
    invoice amount;
    invoice amount paid;
    invoice adjustment amount;
    invoice amount outstanding; and
    invoice amount distributed.

Many of these fields are the same as those described above with respect to the division profile database and consolidated invoice component of the master invoice database, with the exception that these fields reflect sub-invoice, i.e., non-consolidated individual invoice, amounts. For example, an invoice directed to purchases by buyer A would be reflected on a sub-invoice record, as would an invoice directed to buyer B. The consolidation of the buyer A and buyer B invoices are reflected in a consolidated invoice record.

Payment master database 72, payment processing procedure (step 44) and the distribute disaggregated funds process 80 are discussed in detail below with respect to the funds distribution aspect of the present invention. In sum, the invoice consolidation and database update processes of step 38 result in the consolidation of individual divisional invoices 58, and appropriate databases 66 updated to reflect the consolidated invoices and the sub-invoices comprising the consolidated invoice for subsequent invoice verification and payment processing.

It should be noted that the present invention can accommodate multiple sellers supported by one or more service provider systems. For example, a service provider may use only a single provider order management system 24 to accommodate multiple sellers. As such, it is preferable to store invoice data and other data in databases 66 in a format common to all sellers accommodated by system 18. However, because it may be impractical to employ a common format, it is contemplated that more than one format can be used and like sellers grouped to use a particular format. Data received by a seller, for example from seller order management system 22 or from buyer terminals 20, must therefore be converted to a format, i.e., record lengths, types, etc., consistent with databases 66.

In that regard, the service provider preferably provides the seller with the desired record formats so that the data transmitted to service provider order management system 24 is in the proper format. In the alternative, the service provider can develop custom conversion processing routines for each seller and can implement these conversion processes on service provider order management system 24 or another processor which has direct or indirect access to databases 66.

Eventually, it becomes time for the seller to send the consolidated invoice to the buyer. Any method for transmitting the consolidated invoice to the designated buyer representative, for example, the accounts payable manager at the buying company is acceptable. Preferably, one of three transmission methods are used. First, the service provider can present the consolidated statement on-line to the buyer by making that statement available on service provider order management system 24 in a format suitable for viewing and approving via a buyer terminal 20. This process may be initiated, for example, by an electronic mail or other message to the accounts payable manager indicating that a consolidated statement is available for processing. As for the second method, the service provider can prepare and distribute paper statements to the accounts payable manager at the buyer's location. Third, the service provider can push the invoice to buyer terminal 20 using a file delivery mechanism such as the File Transfer Protocol (FTP).

In addition, the accounts payable manager can optionally download the detailed sub-invoice data for subsequent distribution to the individual buyers responsible for the corresponding sub-invoice. An example of the invoice distribution process of step 40 is described with respect to the block diagram in FIG. 7.

Figure 7:
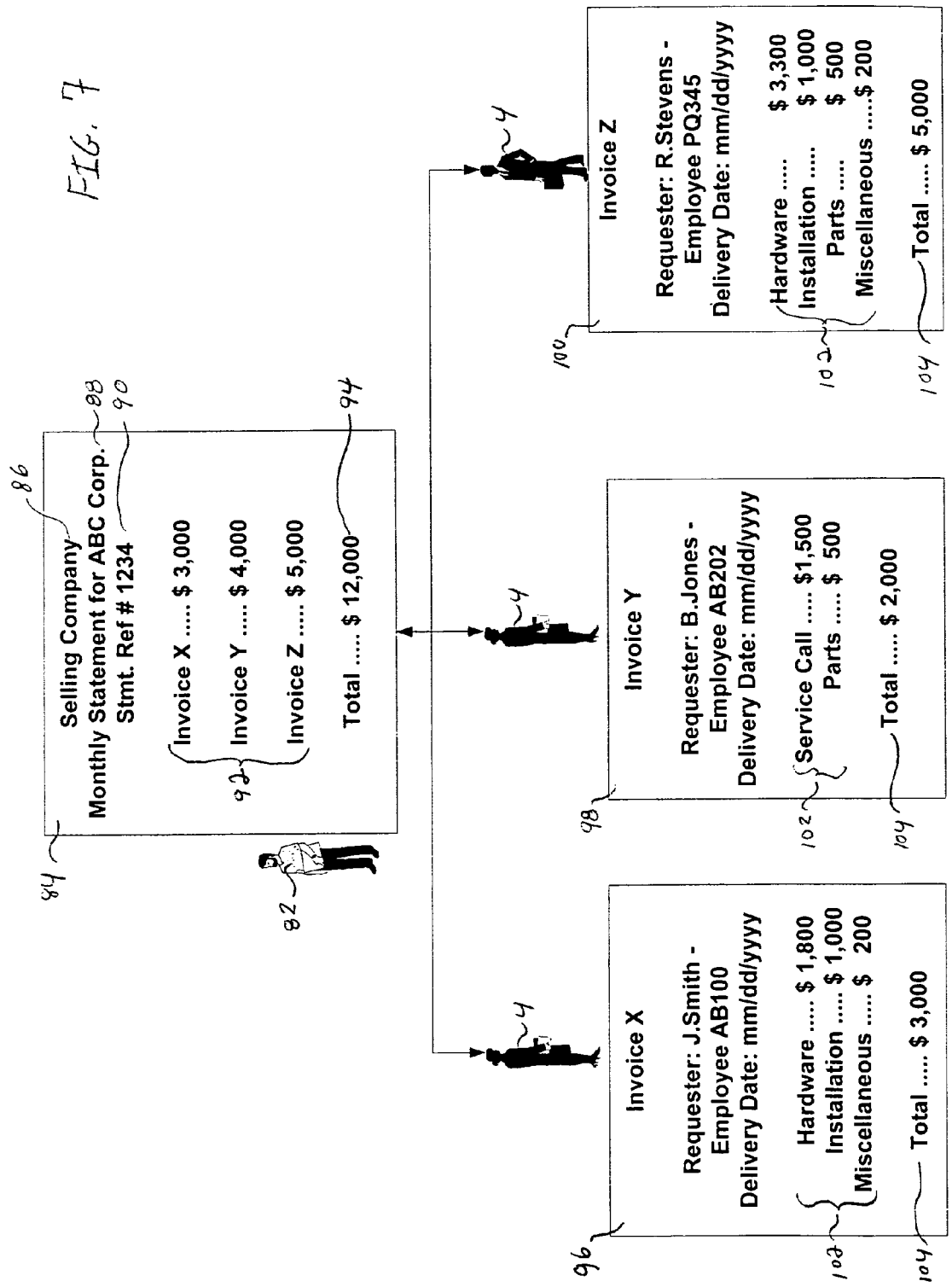
FIG. 7 is a diagram showing the distribution of a consolidated invoice received by a buyer in accordance with the present invention.

As shown in FIG. 7, an accounts payable manager 82 receives consolidated invoice 84. Consolidated invoice 84 includes the name of the selling company 86, a statement title 88 and consolidated invoice reference number 90. Consolidated invoice 84 also comprises sub-invoice data 92 reflecting the sub-invoice title and total sub-invoice amount. Consolidated invoice 84 also includes a consolidated invoice total 94.

Accounts payable manager 82 then distributes the sub-invoice data to buyer 4 responsible for that sub-invoice. As shown in FIG. 7, sub-invoice 96, sub-invoice 98 and sub-invoice 100 have been distributed to buyers 4, respectively J. Smith, B. Jones and R. Stevens.

As is shown in FIG. 7, sub-invoices 96, 98 and 100 each include a sub-invoice detail area 102 and sub-invoice total 104. Sub-invoice detail area 102 allows the corresponding buyer to scrutinize each individual item within the sub-invoice to determine whether to authorize payment for that particular item. Buyer 4 uses whatever internal processes are available within the buying company to notify accounts payable manager 82 as to whether there are any exceptions or disputed items, preferably along with the relevant reason codes explaining why the payment for the corresponding item is being disputed, which items they are, and also the amount to include from their sub-invoice in the total consolidated payment to the seller.

The invoice approval step (step 42) will now be explained in detail with reference to the buyer terminal 20 display screen shown in FIG. 8. As discussed above, accounts payable manager 82 is notified or sent details regarding consolidated monthly statement via a consolidated monthly statement 84. Accounts payable manager 82, or any other authorized individual within the buying company, can use buyer terminal 20 to access service provider order management system 24 to actually approve the invoices corresponding to consolidated invoice 84. It should be noted that, in the case where accounts payable manager 82 accesses service provider order management system 24 to initially receive the consolidated invoice, the display screen shown in FIG. 8 corresponds to consolidated invoice 84. Consolidated invoice display screen 106 is preferably comprised of HTML data transmitted from service provider order management system 24 to buyer terminal 20 via communication network 12. It is also contemplated that the HTML data can be exported to an enterprise resource planner such as those offered by PEOPLESOFT, SAP, and the like.

Consolidated invoice display screen 106 includes title 108, client identifier 110, consolidated statement reference number 112, invoice payment indicators 114, sub-invoice totals 116, invoice payment amount entry areas 118, code entry areas 120, approval button 122 and pay button 124.

Invoice payment indicators 114 are selected by the accounts payable manager to indicate that the corresponding invoice is to have some amount paid toward it. Invoice payment indicators 114 can be implemented as radio buttons, check boxes, or any other suitable browser or graphical user interface mechanism. Sub-invoice totals 116 reflect the total sub-invoice amounts for each corresponding sub-invoice. Invoice payment amount entry areas 118 are completed by accounts payable manager 82 in accordance with the actual amount the buyer is willing to pay against the corresponding invoice. Code entry area 120 provides a mechanism by which accounts payable manager 82 can indicate to the seller specific reasons for the payment. The actual codes can be customized for each buyer or seller to provide particularized details regarding order discrepancies, quality, exception/disputes, etc.

For example, as shown in consolidated invoice display screen 106, accounts payable manager 82 is authorizing some payment for each of invoices X, Y and Z by selecting invoice payment indicators 114 for each of those invoices. Accounts payable manager 82 is authorizing the entire $3,000 to be applied to invoice X, the entire $5,000 in payment for invoice Z, but only $2,000 in payment for invoice Y, for a total payment against this consolidated invoice of $10,000 as shown in consolidated invoice total payment entry area 126. The accounts payable manager 82 can either indicate an approval to authorize subsequent payment of the amount shown in consolidated invoice total payment entry area 126 by selecting approval button 122, or can approve and authorize payment of the amount entered in area 126 by selecting pay button 124.

Selecting pay button 124 automatically causes the buyer's bank to remit payment to the seller's service provider, while selecting approval button 122 indicates to the seller that the amount in area 126 has been approved and that the seller can expect to receive payment in some form. In other words, selecting pay button 124 authorizes the service provider to receive payment instructions from the buyer, preferably via communication network 12 through a secured link, and to collect funds on the seller's behalf. Although any method of remitting a payment is acceptable, preferable methods include remittance via ACH, wire or even a "cutting" and sending a check off-line.

At this point, the buying company has received and reviewed the consolidated and sub-invoices has indicated which items are being paid, indicated which sub-invoices contain a disputed amount, and preferably provided a code in code entry area 120, and either approved the invoice or authorized electronic payment of the consolidated invoice total payment amount.

Figure 9:
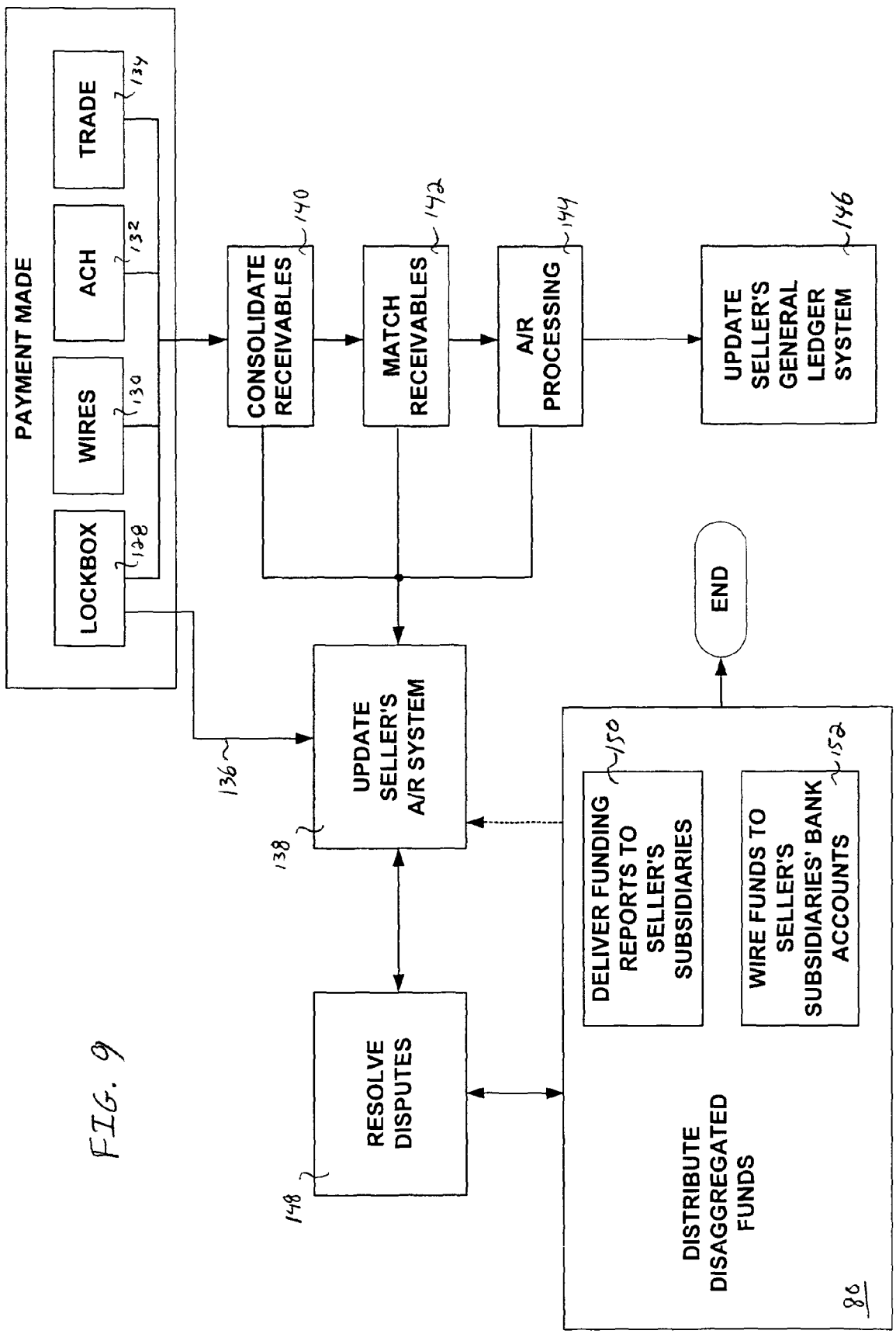
FIG. 9 is a diagram of the process flow of the payment processing aspect of the present invention.

The funds receipt and payment processing procedures of step 44 are explained in detail with respect to FIG. 9. FIG. 9 is a process flow diagram of the payment processing portion of the present invention. In general, a buyer can remit payment to the seller in any known fashion. Preferably, payments are made in the form of a lock box payment 128, a wire transfer 130, an automated clearing house (ACH) payment 132, or a foreign exchange trade 134. Payments can also be made using any acceptable payment method, including electronic cash and cash equivalents, netting via the Internet and electronic wallet technologies. Data relating to the payment is typically received by service provider funds distribution system 30, service provider order management system 24 or seller accounts receivable system 26 (as is typically the case with ACH and lock box payments 132 and 138, respectively). The seller preferably receives payments which include the assigned reference number corresponding to the adjusted consolidated monthly statement total 126.

Upon receiving a payment, payment master database 72 is updated, and this data made available to service provider funds distribution system 30. Payment master database 72 contains payment records which preferably include:
   payment date;
   payment method;
   payment reference;
   payment amount;
   from currency;
   to currency;
   f/x, tax and fee data;
   distribution status; and
   amount distributed.

The payment method refers to whether the payment was received as a lock box payment 128, wire transfer 130, ACH payment 132 or foreign exchange trade payment 134. The payment reference refers to the consolidated invoice payment reference number (shown on consolidated invoice 84 as consolidated statement reference 90). From and to currency refer to the origination and destination currencies in the case where payment is being made via f/x in a currency different that the currency used by the seller, for example, Mexican Pesos and British Pounds. F/x, tax and fee data refer government charges and fees imposed by international financial institutions to pass funds to a third party. Distribution status indicates whether the seller subsidiary has received no distribution, a partial distribution (such as when a sub-invoice contains exceptions or disputed payments), a full distribution net proceeds from a credit card settlement or f/x. Finally, the amount distributed is also stored in payment master database 72. Of course, the distribution status and the amount distributed fields are updated at such time as distribution is made.

A number of options for processing the payment are preferably provided, each method providing an increased level of service and processing for the seller. As the lowest level of service, lock box payments 128 (or wire transfers 130, ACH payments 132 or foreign exchange trades 134) can be processed by service provider funds distribution system 30 to interface with and update seller A/R system 26. This process is shown as link 136.

The process of updating seller A/R system 26 at this lowest level of service entails "manually" updating seller A/R system 26. As such, the relevant data is key-entered by hand by the service provider, for example, the lockbox provider. The file sent from the service provider is preferably an electronic transmission directly to seller A/R system 26.

The manual process is typically used when the buyer's accounts payable manager does not use the electronic, web-based receivables process described above, and instead opts to make adjustments to the consolidated statement, for example, by marking up a paper copy, which is then received by the service provider. Update process 138 involves informing the seller of exactly which receivables have been paid by the buyer and which receivables are still exceptions or are in dispute. This can be accomplished via an electronic file transfer, electronic mail, paper and the like. The manual method shown by link 136 is the most labor-intensive, because the information received from the buyer's accounts payable manager may not sufficiently explain or identify the exceptions and disputed items.

The next level of payment processing is one in which the service provider performs a consolidated receivables process 140. Under process 140, the service provider merges the remittance information on the client access information reporting engine and delivers a final report to the seller by electronic mail, paper, wire transfer, etc. Update process 138 for updating seller's A/R system 26 is then performed as described above.

Under consolidated receivables process 140, all incoming payment data directed to a particular seller are gathered into a single report for that seller to use to update their seller A/R system 26. The payment data can be received from other service providers, for example, other banks, as well as the buyers themselves.

The next most detailed level of payment processing service from the service provider's perspective is one in which match receivables process 142 is performed in addition to consolidate receivables process 140. As part of match receivables process 142, the seller applies the resultant consolidated receivables data to the seller's file of outstanding sub-invoices. The file containing the matching data is then sent to, or made available to, the seller in any manner described above with respect to update process 138. As part of the matching process, it is necessary to access invoice master database 70 and payment master database 72.

The most detailed level of payment processing contemplated as part of the present invention is complete A/R processing 144. Complete A/R processing 144 is substantially the equivalent of complete accounts receivable outsourcing provided by the service provider. As part of A/R processing 144, the service provider maintains the client's receivables database in service provider order management system 24, service provider funds distribution system 30 or another system configured to perform this function. A/R processing 144 receives the results of match receivables process 142, applies the consolidated and matched receivables data to create A/R and general ledger update data, and also updates the seller's general ledger 28 via update process 146. This process is preferably performed via communication network 12. Under A/R processing 144, the process of updating the seller's A/R system as shown in process 138 is incorporated therein. This is the case because the seller typically has control of, or access to, seller A/R system 26.

Once the seller's A/R system has been updated as shown in process 138, the seller has enough information to engage in exception management and dispute resolution, as shown by exception management and dispute resolution process 148. Methods for resolving exceptions and disputes are discussed above. As exceptions and disputes are resolved, and payments are made, written-off, or otherwise promised by or to the seller, the seller's A/R system is updated to reflect the results of exception management and dispute resolution. During or after exception management and dispute resolution process 148, funds which were disaggregated during the consolidate receivables process 140, match receivables process 142 and A/R processing 144 to properly apply a payment to a sub-invoice item can be reported to, and distributed to, the appropriate seller subsidiary.

Distribution of disaggregated funds process 80 is comprised of two main components. The first involves delivering funding reports to seller's subsidiaries, shown as process 150. The second is the actual wiring of funds to the seller's subsidiaries' bank accounts, shown as process 152.

Funding reports are preferably generated by service provider funds distribution system 30 in conjunction with data retrieved from databases 66. In particular, payment master database 72 is updated to reflect the distribution status and amount distributed, and a report is generated by service provider funds distribution system 30 or service provider order management system 24 and communicated to the seller's subsidiary. This report preferably comprises a detailed accounting of which particular sub-invoice items are included in the distribution, along with any other such detail as is necessary. Other details may include payment date, results of exception management and dispute resolution processing, relevant sub-invoice details and reason codes. In other words, reports can include any element stored in databases 66, including status and aging data.

The actual funds which are accounted for in the funding report are wired or transferred using any suitable means, to the seller's subsidiaries' bank accounts shown in process 152. The present invention therefore accommodates an entire quote to payment system which allows a buyer to conveniently enter orders, informs the seller as to any items which are exceptions or are in dispute, and allows a service provider to create a consolidated invoice, receive a payment and unconsolidate the payment in order to disaggregate the funds, update seller's accounts receivable system and optionally the seller's general ledger system, and distribute the disaggregated funds to the seller's subsidiaries.

As part of payment processing procedure step 44, funds may be received and processed in one country, for example, the United States, but allocated to a seller subsidiary abroad, for example, in England. Because it is costly to execute multiple foreign exchange trades, the present invention advantageously provides a mechanism for allocating funds destined for seller's subsidiaries which operate under a different currency until a predetermined total is reached. This avoids the need to make multiple foreign exchange transfers to these countries.

Figure 10:
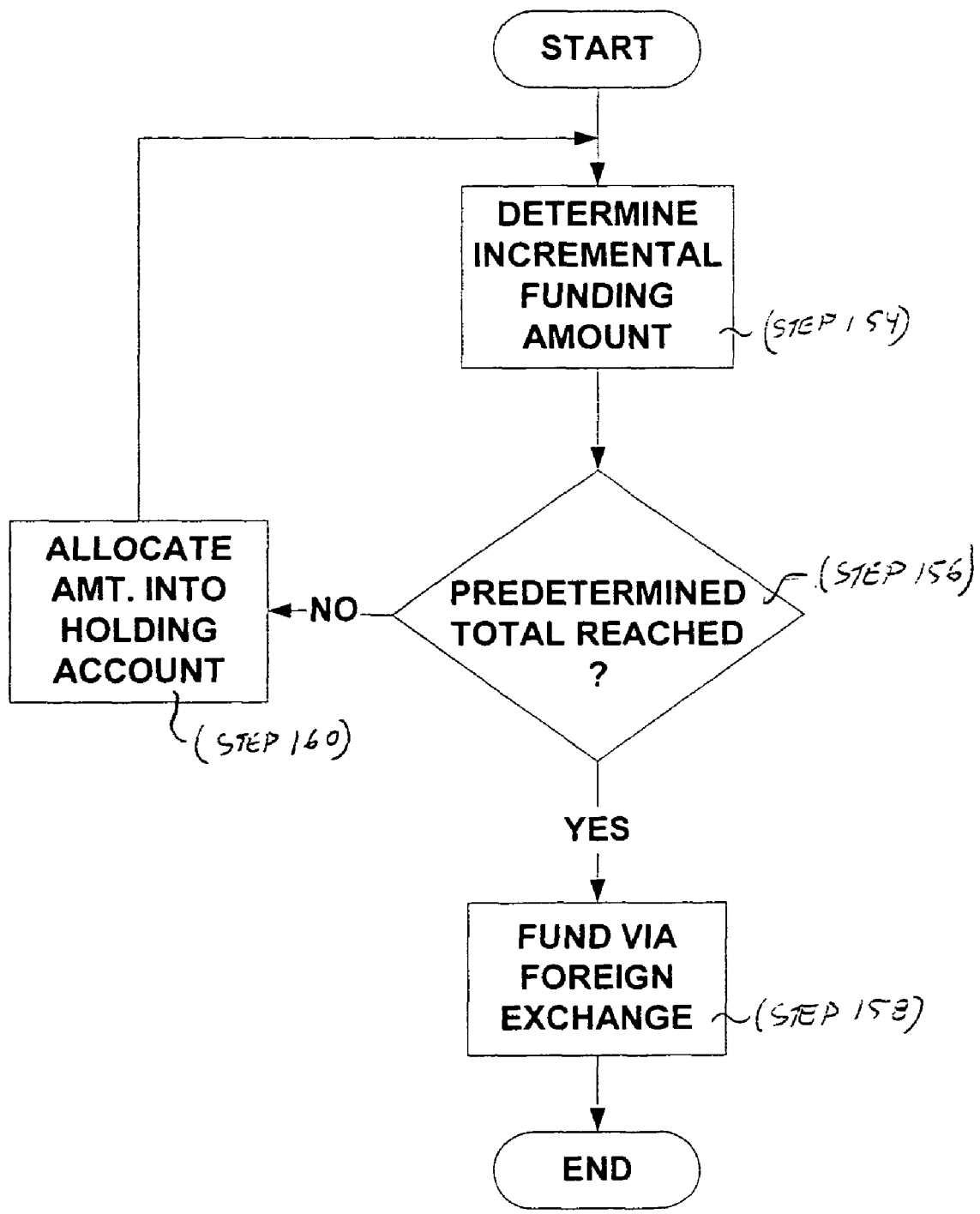
FIG. 10 is a flow chart of the foreign exchange funds allocation process of the present invention.

The foreign exchange funds allocation process is explained with reference to the flow chart in FIG. 10. Initially, an incremental funding amount is determined (step 154). The incremental funding amount is typically determined in processes 140-144, or after the funding report is generated during distribute disaggregated funds process 80. If the addition of the incremental funding amount with a aggregated funding holding account balance amount equals or exceeds a predetermined total (step 156), then the transfer is affected and funding accomplished via foreign exchange trade (step 158). The total aggregated funding can be stored in any of the service provider's (or seller's) systems, but is preferably maintained in service provider funds distribution system 30. If the incremental funding amount does not result in a predetermined total being reached, the incremental funding amount is allocated into a holding account (step 160) as discussed above. In this manner, the present invention allows for efficient foreign exchange activity.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for ordering and payment allocation for a seller and a buying entity, the seller having a plurality of subsidiaries, and the buying entity having a plurality of buyers, the method comprising the acts of:
    receiving, at an ordering and payment allocation system, a plurality of orders comprising at least one order from more than one of the plurality of buyers associated with a buying entity, the plurality of orders corresponding to more than one subsidiary of the seller;
    using a computer processor, consolidating, at the ordering and payment allocation system, the plurality of orders for the buying entity into a consolidated invoice comprising particulars on the orders of the plurality of buyers associated with the buying entity;
    making the consolidated invoice available to the buying entity;
    receiving, at the ordering and payment allocation system, an indication from the buying entity as to which of the orders a payment is approved and which orders are disputed or excepted;
    receiving, at the ordering and payment allocation system, an aggregated payment from the buying entity;
    using the computer processor, disaggregating the aggregated payments by associating portions of the aggregated payment with an approved order and a corresponding subsidiary;
    using the computer processor, allocating the portions of each of the aggregated payments to the corresponding subsidiary for which the payment has been made;
    gathering A/R data and information based on the payments to subsidiaries, approved orders or the disputed or excepted orders;
    providing the A/R data and information to the seller;
    using the computer processor, performing a consolidated receivables process to gather payment data into consolidated receivables data for a single report; and
    using the computer processor, matching the consolidated receivables data to an outstanding sub-invoice file, and providing the matched data to the seller.

2. The method according to claim 1, wherein the orders are received electronically.

3. The method according to claim 2, wherein the orders are received via the Internet.

4. The method according to claim 1, further comprising the act of evaluating a received order against at least one of a spending limit corresponding to the buying entity and an available credit limit corresponding to the buying entity to determine whether to book the received order.

5. The method according to claim 4, further comprising the acts of:
    booking those received orders which have been evaluated as not exceeding the evaluated spending limits; and
    creating a receivable entry in a seller account receivable system.

6. The method according to claim 5, further comprising the act of executing one or more off-balance sheet processes.

7. The method according to claim 1, wherein the consolidation act is comprised of the acts of sorting and compiling the booked orders to create a single invoice.

8. The method according to claim 7, wherein the compiling act includes formatting booked orders received from different buying entities into a common format.

9. The method according to claim 1, wherein the consolidated invoice includes sub-invoice data, sub-invoice data being data which corresponds to booked orders placed by a respective buyer.

10. The method according to claim 9, wherein the sub-invoice data is transmitted to the respective buyer.

11. The method according to claim 1, wherein the act of making the consolidated invoice available includes at least one of:
    sending an electronic message to the buying entity to notify the buying entity of an availability of the consolidated invoice;
    distributing a paper statement to the buying entity; and
    transmitting the consolidated invoice to the buying entity.

12. The method according to claim 1, further comprising the act of displaying the consolidated invoice on a buyer terminal, wherein the buyer indicates approval of sub-invoice items corresponding to the consolidated invoice using the buyer terminal.

13. The method according to claim 12, wherein the indication includes the act of entering a code corresponding to a reason payment is being approved or denied for a sub-invoice item.

14. The method according to claim 12, further comprising the act of using the buyer terminal to authorize payment to the seller.

15. The method according to claim 1, wherein the payment is received via one of an automated clearing house, a wire transfer, a lock box, a foreign exchange trade, electronic cash, netting via the Internet, an electronic wallet and a check.

16. The method according to claim 1, further comprising the act of updating a payment master database, the payment master database comprising records having:
    a payment date;

a payment method;
a payment reference;
a payment amount;
a from currency;
a to currency;
f/x, tax and fee data;
a distribution status; and
an amount distributed.

17. The method according to claim 1, further comprising the act of processing the received aggregated payment.

18. The method according to claim 1, further comprising:
providing complete accounts receivable processing, comprising the acts of:
receiving the matched data;
applying the merged and consolidated receivables data to create accounts receivable and general ledger update data; and
updating a general ledger corresponding to the seller.

19. The method according to claim 1, wherein the payment data gathered into the single report during the consolidated receivables process is received from a plurality of service providers.

20. The method according to claim 1, wherein the allocation act is comprised of the acts of:
disaggregating the received payment to associate portions of the received payment with one or more selling sub-entities;
processing the received payment to update an accounts receivable system;
generating at least one funding report;
delivering the at least one funding report to the respective sub-entities; and
transferring the disaggregated funds to financial accounts for the corresponding sub-entities.

21. The method according to claim 20, wherein the funding report generation act is comprised of the act of updating a payment master database to reflect a distribution status and amount distributed to the corresponding subsidiary.

22. The method according to claim 21, wherein the funding report comprises:
a list of sub-invoice items included in the distribution;
a payment date;
results of exception and dispute processing;
sub-invoice details; and
reason codes.

23. The method according to claim 1, wherein the allocation act includes the acts of:
determining an incremental funding amount;
funding a subsidiary corresponding to a holding account via a foreign exchange if the incremental funding amount equals or exceed a predetermined total when combined with a holding account amount; and
allocating the incremental funding amount to the holding account amount when the incremental funding amount is less than the predetermined total when combined with the holding account amount.

24. The method of claim 1 further comprising the step of assigning a unique reference number to the consolidated invoice to enable tracking and invoice management.

25. The method of claim 1 further comprising the step of determining before the order is booked whether the at least one buyer is able to effect payment.

26. The method of claim 1, wherein the consolidated invoice is received before or contemporaneous with an aggregated payment on the approved orders.

27. The method of claim 1, wherein the aggregated payment comprises a payment to two or more subsidiaries of the seller.

28. A storage medium storing computer executable programmatic code for an order management system for a seller and a buying entity, the seller having a plurality of subsidiaries, and the buying entity having a plurality of buyers, which, when executed, performs the acts of:
receiving, at the order management system, a plurality of orders comprising at least one order from more than one of the plurality of buyers associated with a buying entity, the plurality of orders corresponding to more than one subsidiary of the seller;
consolidating, the order management system, the plurality of orders for the buying entity into a consolidated invoice comprising particulars on the orders of the plurality of buyers associated with the buying entity;
making the consolidated invoice available to the buying entity;
receiving, at the order management system, an indication from the buying entity as to which of the orders a payment is approved and which orders are disputed or excepted;
receiving, at the ordering and payment allocation system, an aggregated payment from the buying entity;
disaggregating the aggregated payments by associating portions of the aggregated payment with an approved order and a corresponding subsidiary;
allocating the portions of each of the aggregated payments to the corresponding subsidiary for which the payment has been made;
gathering A/R data and information based on the payments to subsidiaries, approved orders or the disputed or excepted orders;
providing the A/R data and information to the seller;
performing a consolidated receivables process to gather payment data into consolidated receivables data for a single report; and
matching the consolidated receivables data to an outstanding sub-invoice file, and providing the matched data to the seller.

29. The storage medium according to claim 28, wherein the orders are received electronically.

30. The storage medium according to claim 29, wherein the orders are received via the Internet.

31. The storage medium according to claim 29, wherein the code, when executed, further performs the act of evaluating the received order against at least one of a spending limit corresponding to the buyer's and an available credit limit corresponding to the buying entity to determine whether to book the order.

32. The storage medium according to claim 31, wherein the code, when executed, further performs the acts of:
booking those received orders which have been evaluated as not exceeding the evaluated spending limits; and
creating a receivable entry in a seller account receivable system.

33. The storage medium according to claim 32, wherein the code, when executed, further performs the act of executing one or more off-balance sheet processes.

34. The storage medium according to claim 28, wherein the consolidation act is comprised of the acts of sorting and compiling the booked orders to create a single invoice.

35. The storage medium according to claim 34, wherein the compiling act includes formatting booked orders received from different buying entities into a common format.

36. The storage medium according to claim 28, wherein the consolidated invoice includes sub-invoice data, sub-invoice data being data which corresponds to booked orders placed by a respective buyer.

37. The storage medium according to claim 36, wherein the sub-invoice data is transmitted to the respective buyer.

38. The storage medium according to claim 28, wherein the act of making the consolidated invoice available includes at least one of:
   sending an electronic message to the buying entity to notify the buying entity of an availability of the consolidated invoice;
   distributing a paper statement to the buying entity; and
   transmitting the consolidated invoice to the buying entity.

39. The storage medium according to claim 28, wherein the code, when executed, further performs the act of displaying the consolidated invoice on a buyer terminal, wherein the buyer indicates approval of sub-invoice items corresponding to the consolidated invoice using the buyer terminal.

40. The storage medium according to claim 39, wherein the buyer's approval indication includes the act of entering a code corresponding to a reason payment is being approved or denied for a sub-invoice item.

41. The storage medium according to claim 39, wherein the code, when executed, further performs the act of using the buyer terminal to authorize payment to the seller.

42. The storage medium according to claim 28, wherein the payment is received via one of an automated clearing house, a wire transfer, a lock box, a foreign exchange trade, electronic cash, netting via the Internet, an electronic wallet and a check.

43. The storage medium according to claim 28, wherein the code, when executed, further performs the act of updating a payment master database, the payment master database comprising records which include:
   a payment date;
   a payment method;
   a payment reference;
   a payment amount;
   a from currency;
   a to currency;
   f/x, tax and fee data;
   a distribution status; and
   an amount distributed.

44. The storage medium according to claim 28, wherein the code, when executed, further performs the act of processing the received aggregated payment.

45. The storage medium according to claim 28, further comprising:
   providing complete accounts receivable processing, comprising the acts of:
      receiving the matched data;
      applying the merged and consolidated receivables data to create accounts receivable and general ledger update data; and
      updating a general ledger corresponding to the seller.

46. The storage medium according to claim 28, wherein the payment data gathered into the single report during the consolidated receivables process is received from a plurality of service providers.

47. The storage medium according to claim 28, wherein the code, when executed, further performs an allocation act comprising the acts of:
   disaggregating the received payment to associate portions of the received payment with one or more selling sub-entities;
   processing the received payment to update an accounts receivable system;
   generating at least one funding report;
   delivering the at least one funding report to the respective sub-entities; and
   transferring the disaggregated funds to financial accounts for the corresponding sub-entities.

48. The storage medium according to claim 47, wherein the funding report generation act is comprised of the act of updating a payment master database to reflect a distribution status and amount distributed to the corresponding subsidiary.

49. The storage medium according to claim 48, wherein the funding report comprises at least one of:
   a list of sub-invoice items included in the distribution;
   a payment date;
   results of exception and dispute processing;
   sub-invoice details; and
   reason codes.

50. The storage medium according to claim 28, wherein the code, when executed, further performs an allocation act that includes the acts of:
   determining an incremental funding amount;
   funding a subsidiary corresponding to a holding account via a foreign exchange if the incremental funding amount equals or exceed a predetermined total when combined with a holding account amount; and
   allocating the incremental funding amount to the holding account amount when the incremental funding amount is less than the predetermined total when combined with the holding account amount.

51. The storage medium of claim 28 wherein the programmatic code further performs the act of assigning a unique reference number to the consolidated invoice to enable tracking and invoice management.

* * * * *